(12) United States Patent
Huang et al.

(10) Patent No.: US 11,914,244 B2
(45) Date of Patent: Feb. 27, 2024

(54) DISPLAY PANEL, MANUFACTURING METHOD THEREOF, AND DISPLAY DEVICE

(71) Applicant: BOE Technology Group Co., Ltd., Beijing (CN)

(72) Inventors: Hua Huang, Beijing (CN); Guangcai Yuan, Beijing (CN); Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 722 days.

(21) Appl. No.: 16/978,398

(22) PCT Filed: Dec. 12, 2019

(86) PCT No.: PCT/CN2019/124874
§ 371 (c)(1),
(2) Date: Sep. 4, 2020

(87) PCT Pub. No.: WO2021/114176
PCT Pub. Date: Jun. 17, 2021

(65) Prior Publication Data
US 2023/0130307 A1    Apr. 27, 2023

(51) Int. Cl.
G02F 1/1335     (2006.01)
G02F 1/1333     (2006.01)
G02F 1/1347     (2006.01)

(52) U.S. Cl.
CPC ...... *G02F 1/133548* (2021.01); *G02F 1/1347* (2013.01); *G02F 1/133354* (2021.01)

(58) Field of Classification Search
None
See application file for complete search history.

(56) References Cited

U.S. PATENT DOCUMENTS 10,288,958 B2    5/2019   Tang
2013/0222719 A1*  8/2013  Matsumoto .......... H04N 13/31
                                              349/15

(Continued)

FOREIGN PATENT DOCUMENTS

CN      103842862 A  *  6/2014  ........... G02B 5/3058
CN      105572986 A     5/2016

(Continued)

*Primary Examiner* — Phu Vu
(74) *Attorney, Agent, or Firm* — Banner & Witcoff, Ltd.

(57) ABSTRACT

A display panel, a manufacturing method thereof, and a display device are provided. The display panel includes a first display substrate, a second display substrate, and a third display substrate; the second display substrate and the first display substrate are assembled to form a first liquid crystal cell; the third display substrate and the second display substrate are assembled to form a second liquid crystal cell; the display panel further includes a first wire grid polarizer on the second display substrate and a first bonding portion at a side of the second display substrate close to the first display substrate, and the first bonding portion is located outside the first liquid crystal cell; and an orthographic projection of the first wire grid polarizer on the second display substrate is not overlapped with an orthographic projection of the first bonding portion on the second display substrate.

12 Claims, 10 Drawing Sheets

(56) References Cited

U.S. PATENT DOCUMENTS

2015/0177527 A1\* 6/2015 Park ...................... G02B 30/26
  359/462
2016/0202552 A1   7/2016 Ahn et al.

FOREIGN PATENT DOCUMENTS

| CN | 205670223 U    | 11/2016 |
|----|----------------|---------|
| CN | 106932952 A  * | 7/2017  |
| CN | 106932952 A    | 7/2017  |
| CN | 107247360 A    | 10/2017 |
| CN | 108957841 A    | 12/2018 |
| CN | 110286533 A    | 9/2019  |
| CN | 110346941 A    | 10/2019 |

\* cited by examiner

DISPLAY PANEL, MANUFACTURING METHOD THEREOF, AND DISPLAY DEVICE

This application is a U.S. National Phase Entry of International Application No. PCT/CN2019/124874 filed on Dec. 12, 2019, designating the United States of America. The present application claims priority to and the benefit of the above-identified application and the above-identified application is incorporated by reference herein in its entirety.

TECHNICAL FIELD

At least one embodiment of the present disclosure relates to a display panel, a manufacturing method thereof, and a display device.

BACKGROUND

For a liquid crystal display panel, the display quality thereof can be improved by local dimming (LD) technology. In order to use the local dimming technology in, for example, a side-lit backlight unit, it is necessary to add a dimming panel between the liquid crystal display panel and the side-lit backlight unit. The dimming panel can control the transmittance of a predetermined region. For a part of an image with high brightness (grayscale), the transmittance of a corresponding region of the dimming panel is also high, allowing more light from the backlight unit to pass through, and for a part of an image with low brightness, the transmittance of a corresponding region of the dimming panel is also low, allowing less light from the backlight unit to pass through; thereby achieving the aims of improving the contrast of the displayed image and enhancing the display quality.

SUMMARY

At least one embodiment of the present disclosure relates to a display panel, a manufacturing method thereof, and a display device.

At least one embodiment of the present disclosure provides a display panel, which includes: a first display substrate; a second display substrate, the second display substrate and the first display substrate being assembled to form a first liquid crystal cell; a third display substrate at a side of the second display substrate away from the first display substrate, the third display substrate and the second display substrate being assembled to form a second liquid crystal cell; a first wire grid polarizer on the second display substrate; and a first bonding portion at a side of the second display substrate close to the first display substrate, the first bonding portion being located outside the first liquid crystal cell; an orthographic projection of the first wire grid polarizer on the second display substrate is not overlapped with an orthographic projection of the first bonding portion on the second display substrate.

According to the display panel provided by one or more embodiments of the present disclosure, the first bonding portion includes at least one selected from the group consisting of a first pad portion and a first alignment mark, the first pad portion is configured to be connected with a first external circuit, and the first alignment mark is configured to align the first pad portion with the first external circuit in a bonding process.

According to the display panel provided by one or more embodiments of the present disclosure, the display panel further includes a second wire grid polarizer, the second wire grid polarizer is at a side of the third display substrate away from the second display substrate, and an orthographic projection of the second wire grid polarizer on the second display substrate is not overlapped with the orthographic projection of the first bonding portion on the second display substrate.

According to the display panel provided by one or more embodiments of the present disclosure, the display panel further includes a second bonding portion, the second bonding portion is at a side of the third display substrate close to the second display substrate and is located outside the second liquid crystal cell, and an orthographic projection of the second bonding portion on the third display substrate is not overlapped with an orthographic projection of the second wire grid polarizer on the third display substrate.

According to the display panel provided by one or more embodiments of the present disclosure, the second bonding portion includes at least one selected from the group consisting of a second pad portion and a second alignment mark, the second pad portion is configured to be connected with a second external circuit, and the second alignment mark is configured to align the second pad portion with the second external circuit in a bonding process.

According to the display panel provided by one or more embodiments of the present disclosure, the orthographic projection of the second bonding portion on the third display substrate is not overlapped with an orthographic projection of the first bonding portion on the third display substrate.

According to the display panel provided by one or more embodiments of the present disclosure, the second bonding portion and the first bonding portion are at opposite sides of the first liquid crystal cell, respectively.

According to the display panel provided by one or more embodiments of the present disclosure, the second bonding portion and the first bonding portion are at a same side of the first liquid crystal cell.

According to the display panel provided by one or more embodiments of the present disclosure, an orthographic projection of the first bonding portion on the third display substrate is at a side of the orthographic projection of the second bonding portion on the third display substrate close to the second liquid crystal cell.

According to the display panel provided by one or more embodiments of the present disclosure, an orthographic projection of the second pad portion on the third display substrate is not overlapped with an orthographic projection of the second display substrate on the third display substrate.

According to the display panel provided by one or more embodiments of the present disclosure, the first wire grid polarizer is at a side of the second display substrate close to the first display substrate or at a side of the second display substrate close to the third display substrate.

According to the display panel provided by one or more embodiments of the present disclosure, a protective layer is provided at a side of the second display substrate away from the first display substrate, the protective layer covers the first wire grid polarizer, and a material of the protective layer includes an optical clear adhesive.

According to the display panel provided by one or more embodiments of the present disclosure, the first wire grid polarizer goes beyond an edge of a display region of the display panel by at least 50 µm.

At least one embodiment of the present disclosure further provides a display device, which includes any one of the display panels as described above.

At least one embodiment of the present disclosure further provides a manufacturing method of a display panel, which includes: assembling a first display substrate with a second display substrate to form a first liquid crystal cell; and assembling the second display substrate with a third display substrate to form a second liquid crystal cell; the manufacturing method of the display panel further includes: forming a first wire grid polarizer, the first wire grid polarizer being formed on the second display substrate; and forming a first bonding portion, the first bonding portion being formed at a side of the second display substrate close to the first display substrate and being located outside the first liquid crystal cell; an orthographic projection of the first wire grid polarizer on the second display substrate is not overlapped with an orthographic projection of the first bonding portion on the second display substrate.

According to the manufacturing method provided by one or more embodiments of the present disclosure, the forming the first wire grid polarizer includes: forming a first metal film on the second display substrate; patterning the first metal film to form a first metal pattern, the first metal pattern going beyond an edge of a display region of the display panel by at least 50 μm; and patterning the first metal pattern in a nano-imprint manner to form the first wire grid polarizer.

According to the manufacturing method provided by one or more embodiments of the present disclosure, after assembling the first display substrate with the second display substrate to form the first liquid crystal cell, the manufacturing method includes forming the first wire grid polarizer on the second display substrate, and the first wire grid polarizer being formed at a side of the second display substrate away from the first display substrate; before forming the first wire grid polarizer, the manufacturing method further includes: forming a sealed space between the first display substrate and the second display substrate to seal the first liquid crystal cell; and the forming the first wire grid polarizer includes: cleaning the first display substrate and the second display substrate that are provided with the sealed space.

According to the manufacturing method provided by one or more embodiments of the present disclosure, after forming the first wire grid polarizer, the manufacturing method further includes: forming a protective layer at a side of the second display substrate away from the first liquid crystal cell, the protective layer covers the first wire grid polarizer and the protective layer adopts an optical clear adhesive.

According to the manufacturing method provided by one or more embodiments of the present disclosure, before assembling the first display substrate with the second display substrate to form the first liquid crystal cell, the manufacturing method further includes: forming an anti-static protective layer at a side of the second display substrate; after assembling the first display substrate with the second display substrate to form the first liquid crystal cell and before forming the first wire grid polarizer, the manufacturing method further includes: removing the anti-static protective layer.

According to the manufacturing method provided by one or more embodiments of the present disclosure, the manufacturing method further includes: forming a second wire grid polarizer, the second wire grid polarizer is formed at a side of the third display substrate away from the second display substrate, and an orthographic projection of the second wire grid polarizer on the second display substrate is not overlapped with the orthographic projection of the first bonding portion on the second display substrate.

According to the manufacturing method provided by one or more embodiments of the present disclosure, the manufacturing method further includes: forming a second bonding portion, the second bonding portion is formed at a side of the third display substrate close to the second display substrate and is located outside the second liquid crystal cell, and an orthographic projection of the second bonding portion on the third display substrate is not overlapped with an orthographic projection of the second wire grid polarizer on the third display substrate.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not construed as any limitation to the present disclosure.

DETAILED DESCRIPTION

In order to make objectives, technical solutions, and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

In recent years, the competition of display devices such as large-sized display devices has become more and more fierce. For example, the display devices include TVs, but are not limited thereto.

Figure 1:
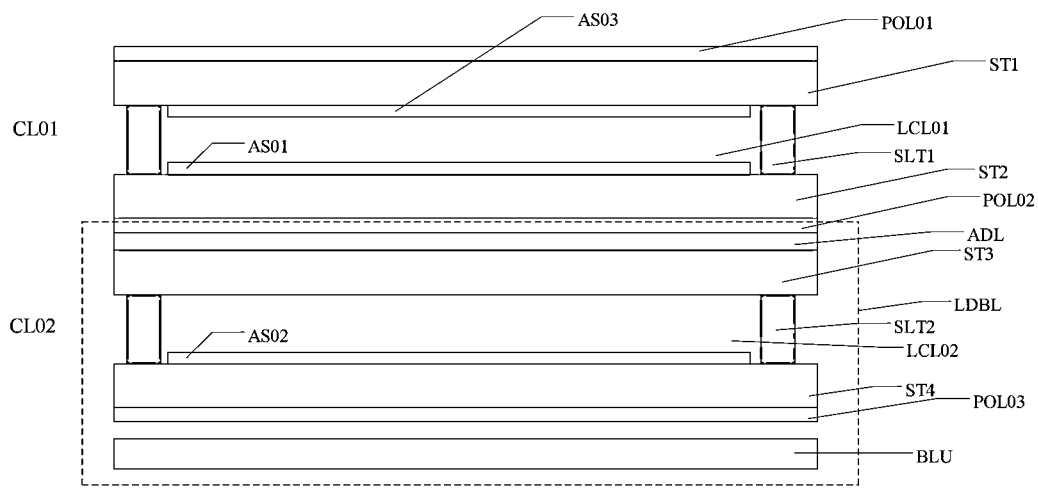
FIG. 1 is a schematic diagram of a display device.

FIG. 1 is a schematic diagram of a display device. As illustrated in FIG. 1, the display device includes a first liquid crystal cell CL01 and a second liquid crystal cell CL02. The first liquid crystal cell CL01 and the second liquid crystal cell CL02 are stacked.

As illustrated in FIG. 1, the first liquid crystal cell CL01 includes a first display substrate ST1 and a second display substrate ST2 disposed opposite to the first display substrate ST1, and a first sealant SLT1 is disposed between the first display substrate ST1 and the second display substrate ST2 to bond and seal the first display substrate ST1 with the second display substrate ST2. The first liquid crystal cell CL01 includes a first liquid crystal layer LCL01 located in the first liquid crystal cell CL01. The first liquid crystal cell CL01 further includes a first polarizer POL01 located at a side of the first display substrate ST1 away from the second display substrate ST2, and a second polarizer POL02 located at a side of the second display substrate ST2 away from the first display substrate ST1.

As illustrated in FIG. 1, the second liquid crystal cell CL02 includes a third display substrate ST3 and a fourth display substrate ST4 disposed opposite to the third display substrate ST1, and a second sealant SLT2 is disposed between the third display substrate ST3 and the fourth display substrate ST4 to bond and seal the third display substrate ST3 with the fourth display substrate ST4. The second liquid crystal cell CL02 includes a second liquid crystal layer LCL02 located in the second liquid crystal cell CL02. The second liquid crystal cell CL02 further includes a third polarizer POL03 located at a side of the fourth display substrate ST4 away from the third display substrate ST3. For example, directions of the light transmission axes of the first polarizer POL01 and the third polarizer POL03 are the same, and a direction of the light transmission axis of the second polarizer POL02 is perpendicular to the directions of the light transmission axes of the first polarizer POL01 and the third polarizer POL03.

As illustrated in FIG. 1, the first liquid crystal cell CL01 and the second liquid crystal cell CL02 are bonded together by an adhesive layer ADL.

As illustrated in FIG. 1, the display device further includes a backlight unit BLU. Light emitted from the backlight unit BLU can be modulated when passing through the second liquid crystal cell CL02, that is, the second liquid crystal cell CL02 can control a transmittance of a predetermined region. The backlight unit BLU and the second liquid crystal cell CL02 form a local dimming backlight LDBL.

For example, a side of the second display substrate ST2 close to the first display substrate ST1 is provided with a first array structure AS01, a side of the fourth display substrate ST4 close to the third display substrate ST3 is provided with a second array structure AS02, and a side of the first display substrate ST1 close to the second display substrate ST2 is provided with a third array structure AS03. For example, the first array structure AS01 includes a first electrode structure for controlling the rotation of liquid crystal molecules in the first liquid crystal layer LCL01, the second array structure AS02 includes a second electrode structure for controlling the rotation of liquid crystal molecules in the second liquid crystal layer LCL02, and the third array structure AS03 includes a black matrix and a color filter layer.

However, the display device illustrated in FIG. 1 has at least one of the following problems. Firstly, because four display substrates are used, the transmittance of the display device is low; secondly, due to a large distance between the first liquid crystal cell CL01 and the second liquid crystal cell CL02, the rainbow pattern is obvious; thirdly, the bonding yield of the bonding process for forming the adhesive layer ADL is generally 70%~80%, the bonding yield is low, and the adhesive layer ADL leads to defects such as horizontal mura; finally, the alignment accuracy of the first liquid crystal cell CL01 and the second liquid crystal cell CL02 is usually greater than or equal to 300 microns, and the alignment accuracy is low, which leads to low image sharpness.

Figure 2:
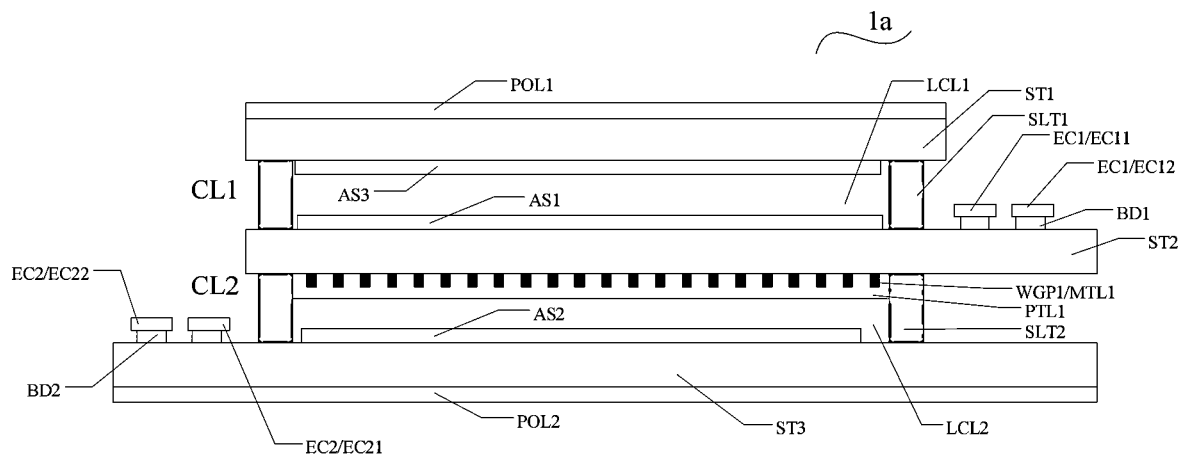
FIG. 2 is a schematic diagram of a display panel provided by an embodiment of the present disclosure.

FIG. 2 is a schematic diagram of a display panel provided by an embodiment of the present disclosure. As illustrated in FIG. 2, the display panel 1a includes a first display substrate ST1, a second display substrate ST2, and a third display substrate ST3. As illustrated in FIG. 2, the second display substrate ST2 and the first display substrate ST1 are assembled to form a first liquid crystal cell CL1. The third display substrate ST3 is located at a side of the second display substrate ST2 away from the first display substrate ST1, and the third display substrate ST3 and the second display substrate ST2 are assembled to form a second liquid crystal cell CL2. As illustrated in FIG. 2, the display panel 1a further includes a first wire grid polarizer WGP1 and a first bonding portion BD1. The first wire grid polarizer WGP1 is located on the second display substrate ST2. The first bonding portion BD1 is located at a side of the second display substrate ST2 close to the first display substrate ST1 and is located outside the first liquid crystal cell CL1. An orthographic projection of the first wire grid polarizer WGP1 on the second display substrate ST2 is not overlapped with an orthographic projection of the first bonding portion BD1 on the second display substrate ST2, so as to facilitate bonding of a first external circuit EC1 to the second display substrate ST2. As illustrated in FIG. 2, the first wire grid polarizer WGP1 is located at a side of the second display substrate ST2 close to the third display substrate ST3. For example, the first liquid crystal cell CL1 is a display liquid crystal cell and the second liquid crystal cell CL2 is a dimming liquid crystal cell.

In the bonding process in which the first external circuit EC1 is bonded to the second display substrate ST2, when a camera such as a charge coupled device (CCD) is used to align an alignment mark on the second display substrate ST2 with an alignment mark on the first external circuit EC1, if the first wire grid polarizer WGP1 is overlapped with the first bonding portion BD1, it is not conducive to the alignment of the two alignment marks, thereby affecting the bonding effect. In the embodiment of the present disclosure, the orthographic projection of the first wire grid polarizer WGP1 on the second display substrate ST2 is not overlapped with the orthographic projection of the first bonding portion BD1 on the second display substrate ST2, so that the first wire grid polarizer WGP1 does not interfere with the alignment of the two alignment marks, which is beneficial to the bonding process.

For example, the display panel 1a further includes a second bonding portion BD2, the second bonding portion BD2 is located at a side of the third display substrate ST3 close to the second display substrate ST2 and is located outside the second liquid crystal cell CL2. An orthographic projection of the second bonding portion BD2 on the third display substrate ST3 is not overlapped with an orthographic projection of the first wire grid polarizer WGP1 on the third display substrate ST3, so as to prevent the first wire grid polarizer WGP1 from affecting the bonding of a second external circuit EC2 to the third display substrate ST3.

For example, as illustrated in FIG. 2, in order to prevent mutual interference from affecting the bonding process, the orthographic projection of the second bonding portion BD2 on the third display substrate ST3 is not overlapped with the orthographic projection of the first bonding portion BD1 on the third display substrate ST3.

As illustrated in FIG. 2, the display panel 1a further includes a polarizer POL1 located at the side of the first display substrate ST1 away from the second display substrate ST2 and a polarizer POL2 located at a side of the third display substrate ST3 away from the second display substrate ST2. For example, the light transmission axes of the polarizers POL1 and POL2 are in the same direction, and the direction of the light transmission axis of the first wire grid polarizer WGP1 is perpendicular to the directions of the light transmission axes of the polarizers POL1 and POL2.

The display panel provided by the embodiment of the present disclosure adopts three display substrates, omits one display substrate, and further reduces the distance between the two liquid crystal cells, for example, the distance between the two liquid crystal cells is reduced by a thickness of one display substrate, for example, by 0.5 mm, thereby improving the transmittance, improving the dynamic contrast and solving the problem of low contrast. Because the first wire grid polarizer WGP1 is formed on the second display substrate ST2, it is not necessary to attach a polarizer between the first liquid crystal cell CL1 and the second liquid crystal cell CL2, thus, the attaching process of attaching the polarizer between the two liquid crystal cells can be omitted. Because the adhesive layer between the two liquid crystal cells is not provided, defects, such as rainbow patterns, water ripples, moire mura, etc., can be avoided. The structure of three display substrates has a high alignment accuracy, can maintain sharpness of an image, reduce boundary ripple defects, improve display quality, and meet the market demand of high-end products.

For example, as illustrated in FIG. 2, a first protective layer PTL1 is provided at the side of the second display substrate ST2 away from the first display substrate ST1 to cover the first wire grid polarizer WGP1, so as to protect the first wire grid polarizer WGP1. For example, a material of the first protective layer PTL1 includes, but is not limited to, optical clear adhesive. In the case where the first protective layer PTL1 adopts an optical clear adhesive, bubbles can be prevented from being generated after the assembling process. For example, as illustrated in FIG. 2, the first protective layer PTL1 is in contact with the first wire grid polarizer WGP1.

For example, as illustrated in FIG. 2, the first liquid crystal cell CL1 includes a first display substrate ST1 and a second display substrate ST2 that are oppositely disposed, the first display substrate ST1 and the second display substrate ST2 are sealed by using a first sealant SLT1 to form the first liquid crystal cell CL1, and the second liquid crystal cell CL2 is formed by sealing the second display substrate ST2 with a third display substrate ST3 that is disposed opposite to the second display substrate ST2 by using a second sealant SLT2. The first display substrate ST1, the second display substrate ST2, and the third display substrate ST3 are stacked.

For example, as illustrated in FIG. 2, the first liquid crystal cell CL1 includes a first liquid crystal layer LCL1 located in the first liquid crystal cell CL1, and the second liquid crystal cell CL2 includes a second liquid crystal layer LCL2 located in the second liquid crystal cell CL2.

Figure 3:
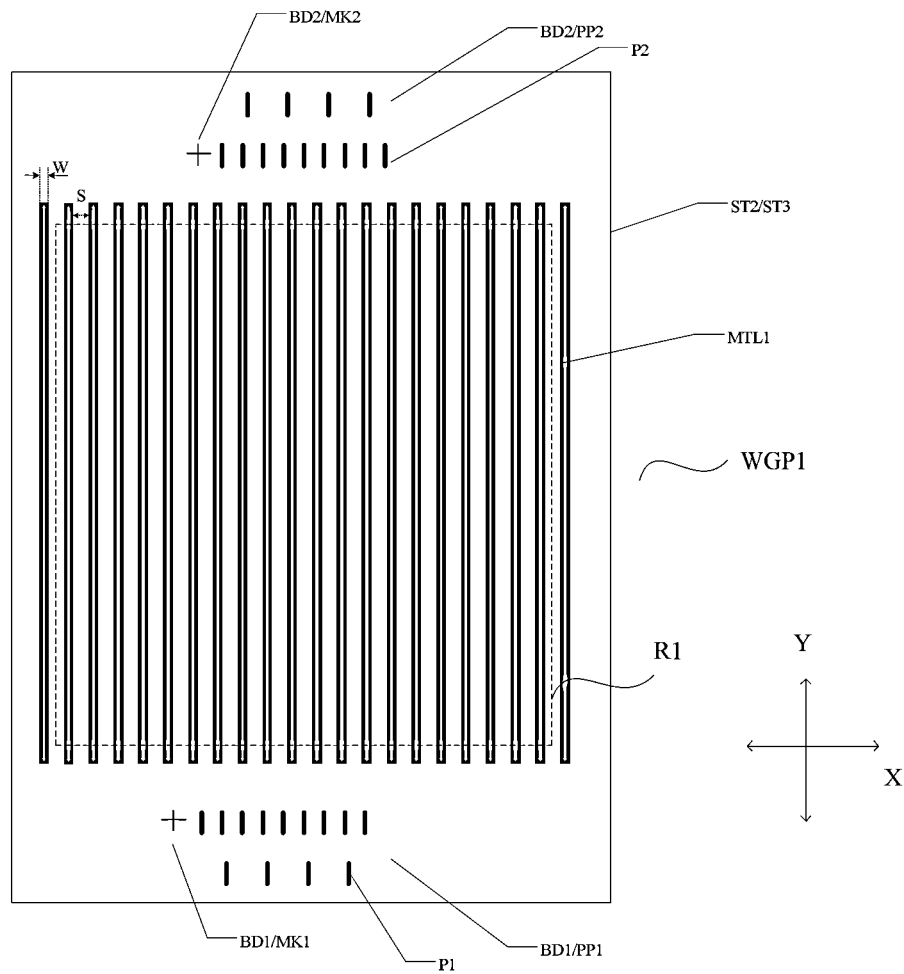
FIG. 3 is a plan view of a display panel provided by an embodiment of the present disclosure.

FIG. 3 is a plan view of a display panel provided by an embodiment of the present disclosure. For example, as illustrated in FIG. 3, the first bonding portion BD1 includes at least one selected from the group consisting of a first pad portion PP1 and a first alignment mark MK1, the first pad portion PP1 is configured to be connected with a first external circuit EC1, and the first alignment mark MK1 is configured to align the first pad portion PP1 with the first external circuit EC1 in a bonding process. Referring to FIG. 3 and FIG. 2, the first pad portion PP1 includes a plurality of first pads P1, the plurality of first pads P1 are divided into first pads of two rows, the first pads P1 of one row are bonded with a first integrated circuit EC11 and the first pads P1 of the other row are bonded with a first flexible printed circuit board EC12.

For example, as illustrated in FIG. 3, in order to obtain a better polarization effect, the first wire grid polarizer WGP1 goes beyond a display region R1 of the display panel. In FIG. 3, the display region R1 is illustrated by a dashed box. For example, the first wire grid polarizer WGP1 goes beyond an edge of the display region R1 of the display panel by at least 50 µm. For example, as illustrated in FIG. 3, the first wire grid polarizer WGP1 goes beyond the edges of the display region R1 of the display panel by at least 50 µm in the four directions of up, down, left and right.

For example, as illustrated in FIG. 3, the second bonding portion BD2 includes at least one selected from the group consisting of a second pad portion PP2 and a second alignment mark MK2, the second pad portion PP2 is configured to be connected with a second external circuit EC2, and the second alignment mark MK2 is configured to align the second pad portion PP2 with the second external circuit EC2 in a bonding process. Referring to FIG. 3 and FIG. 2, the second pad portion PP2 includes a plurality of second pads P2, the plurality of second pads P2 are divided into second pads of two rows, the second pads P2 of one row are bonded to a second integrated circuit EC21 and the second pads P2 of the other row are bonded to a second flexible printed circuit board EC22.

For example, as illustrated in FIG. 3, the second bonding portion BD2 and the first bonding portion BD1 are disposed at opposite sides of the first liquid crystal cell CL1. This arrangement method can reduce design changes, does not need to redesign the peripheral wiring of the second liquid crystal cell in the original scheme (e.g., the structure illustrated in FIG. 1), and can reduce physical interference of materials of the first liquid crystal cell and the second liquid crystal cell in the bonding process. For example, this arrangement can have no interference on the identification of the first alignment mark of the first liquid crystal cell CL1 and the second alignment mark of the second liquid crystal cell CL2, have no physical interference to occur in the bonding process, and have no impact on confirmation of the bonding effect of the first liquid crystal cell CL1 and the second liquid crystal cell CL2.

Referring to FIG. 3 and FIG. 2, the first wire grid polarizer WGP1 includes a plurality of first metal wires MTL1, the plurality of first metal wires MTL1 are parallel with each other. For example, a width of each first metal wire MTL1 is in nanoscale, and a spacing between two adjacent first metal wires MTL1 is in nanoscale. The plurality of first metal wires MTL1 are arranged in a first direction X, and each first metal wire MTL1 extends in a second direction Y. Of the light incident on the first wire grid polarizer WGP1, light parallel with an extending direction of the first metal wire MTL1 is reflected, and light perpendicular to the extending direction of the first metal wire MTL1 can pass through the first wire grid polarizer WGP1, so that the first wire grid polarizer WGP1 can function as a polarizer.

For example, as illustrated in FIG. 3, a width W of the first metal wire MTL1 is in a range of 50-75 nm, a spacing S between two adjacent first metal wires MTL1 is in a range of 50-75 nm, and a height of the first metal wire MTL1 is in a range of 150-250 nm. Under the condition of these parameters, a polarization degree of the first wire grid polarizer WGP1 can reach 99.87%.

For example, the width W of the first metal wire MTL1 is 68 nm, the spacing S between two adjacent first metal wires MTL1 is 73 nm, and the height of the first metal wire MTL1 is 178 nm.

For example, the width of the first metal wire MTL1 is a size of the first metal wire MTL1 in the first direction X, and the spacing S between two adjacent first metal wires MTL1 is a spacing between two adjacent first metal wires MTL1 in the first direction X. For example, the height of the first metal wire MTL1 is a size of the first metal wire MTL1 in the direction perpendicular to the second display substrate ST2.

For example, the first wire grid polarizer WGP1 may be made of a metal material, and the metal material includes but is not limited to aluminum.

Figure 4:
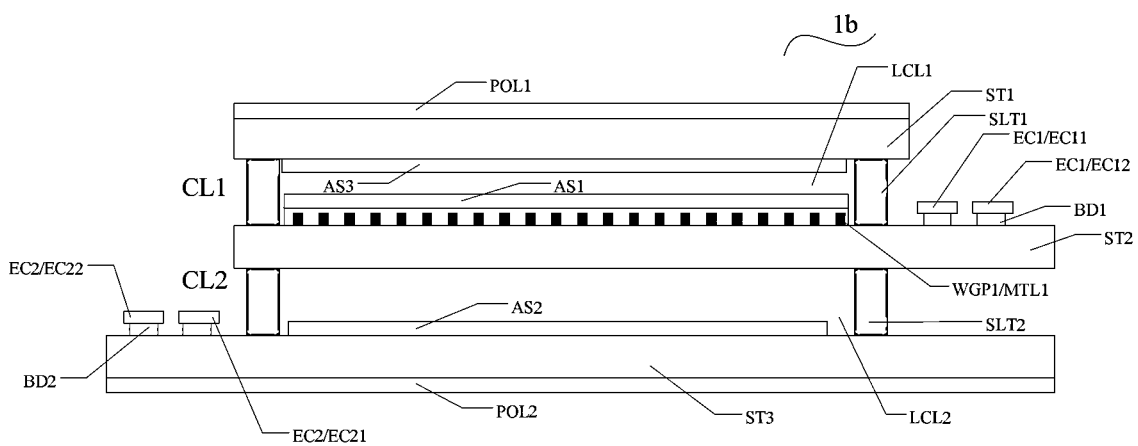
FIG. 4 is a schematic diagram of a display panel provided by an embodiment of the present disclosure.

FIG. 4 is a schematic diagram of a display panel provided by an embodiment of the present disclosure. Compared with the display panel 1a illustrated in FIG. 2, the display panel 1b illustrated in FIG. 4 is different in that the first wire grid polarizer WGP1 is located at a side of the second display substrate ST2 close to the first display substrate ST1.

Figure 5:
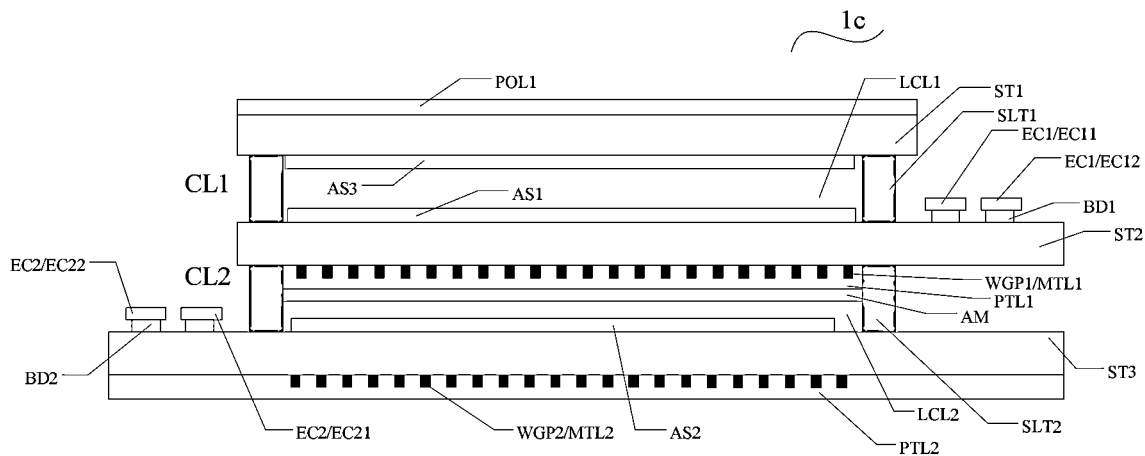
FIG. 5 is a schematic diagram of a display panel provided by an embodiment of the present disclosure.

FIG. 5 is a schematic diagram of a display panel provided by an embodiment of the present disclosure. Compared with the display panel 1a illustrated in FIG. 2, the display panel 1c illustrated in FIG. 5 is different in that a second wire grid polarizer WGP2 is used to replace the polarizer POL2.

The display panel 1c illustrated in FIG. 5 includes both a first wire grid polarizer WGP1 and a second wire grid polarizer WGP2. In the display panel 1c illustrated in FIG. 5, the first wire grid polarizer WGP1 is located at the side of the second display substrate ST2 away from the first display substrate ST1, and the second wire grid polarizer WGP2 is located at the side of the third display substrate ST3 away from the second display substrate ST2. The first wire grid polarizer WGP1 illustrated in FIG. 5 can be referred to the first wire grid polarizer WGP1 illustrated in FIG. 2, and details will not be repeated here. For example, in the display panel 1c, an extending direction of the first metal wire MTL1 in the first wire grid polarizer WGP1 is perpendicular to an extending direction of the second metal wire MTL2 in the second wire grid polarizer WGP2.

For example, as illustrated in FIG. 5, the second wire grid polarizer WGP2 is located at the side of the third display substrate ST3 away from the second display substrate ST2, and an orthographic projection of the second wire grid polarizer WGP2 on the second display substrate ST2 is not overlapped with an orthographic projection of the first bonding portion BD1 on the second display substrate ST2, thereby avoiding the second wire grid polarizer WGP2 from affecting the bonding of the first external circuit EC1.

As illustrated in FIG. 5, a protective layer PTL1 is provided at the side of the second display substrate ST2 away from the first display substrate ST1 to cover the first wire grid polarizer WGP1, so as to protect the first wire grid polarizer WGP1, and a protective layer PTL2 is provided at the side of the third display substrate ST3 away from the second display substrate ST2 to cover the second wire grid polarizer WGP2, so as to protect the second wire grid polarizer WGP2.

The arrangement of the wire grid polarizer (at least one of the first wire grid polarizer WGP1 or the second wire grid polarizer WGP2) will reduce the transmittance of the display panel. For example, the wire grid polarizer may have influence on an electric field in at least one of the first liquid crystal cell CL1 or the second liquid crystal cell CL2, so that the transmittance is reduced, and for example, the transmittance can be reduced by about 6%.

For example, at least one of the first liquid crystal layer LCL1 or the second liquid crystal layer LCL2 adopts a negative liquid crystal material, so as to improve the contrast of the display panel.

The liquid crystal material includes a positive liquid crystal material and a negative liquid crystal material, the liquid crystal molecule in the liquid crystal material includes a long axis and a short axis, a dielectric constant in a direction of the long axis is a parallel dielectric constant, a dielectric constant in a direction of the short axis is a vertical dielectric constant, and the liquid crystal material has dielectric anisotropy. In the negative liquid crystal material, the parallel dielectric constant is less than the vertical dielectric constant, and correspondingly, in the positive liquid crystal material, the parallel dielectric constant is greater than the vertical dielectric constant. Under an action of an electric field, the liquid crystal molecules in the negative liquid crystal material are rotated to be arranged in a direction of the short axis of the liquid crystal molecule, while the liquid crystal molecules in the positive liquid crystal material are rotated to be arranged in a direction of the long axis of the liquid crystal molecule.

In the display panel provided by some embodiments of the present disclosure, at least one of the first liquid crystal layer LCL1 or the second liquid crystal layer LCL2 adopts a negative liquid crystal material, and the liquid crystal molecules in the negative liquid crystal material are rotated to be arranged in a direction of the short axis of liquid crystal molecule, thereby greatly reducing the influence of the first wire grid polarizer WGP1 on the transmittance of the display panel and improving the contrast.

For example, in the display panel 1c illustrated in FIG. 5, in order to reduce the influence of the second wire grid polarizer WGP2 on the electric field in the second liquid crystal cell CL2, the second liquid crystal layer LCL2 can adopt a negative liquid crystal material. For example, in the display panel 1c illustrated in FIG. 5, in order to reduce the influence of the first wire grid polarizer WGP1 on the electric field in the first liquid crystal cell CL1, the first liquid crystal layer LCL1 can also adopt a negative liquid crystal material.

For example, in the display panel 1c illustrated in FIG. 5, a protective layer PTL1 may be further provided between an alignment layer AM and the first wire grid polarizer WGP1, the arrangement of the protective layer PTL1 can be referred to the arrangement of the protective layer PTL1 in FIG. 2, the protective layer PTL1 covers the first wire grid polarizer WGP1, and the alignment layer AM can be further provided at the side of the protective layer PTL1 away from the first display substrate ST1.

Figure 6:
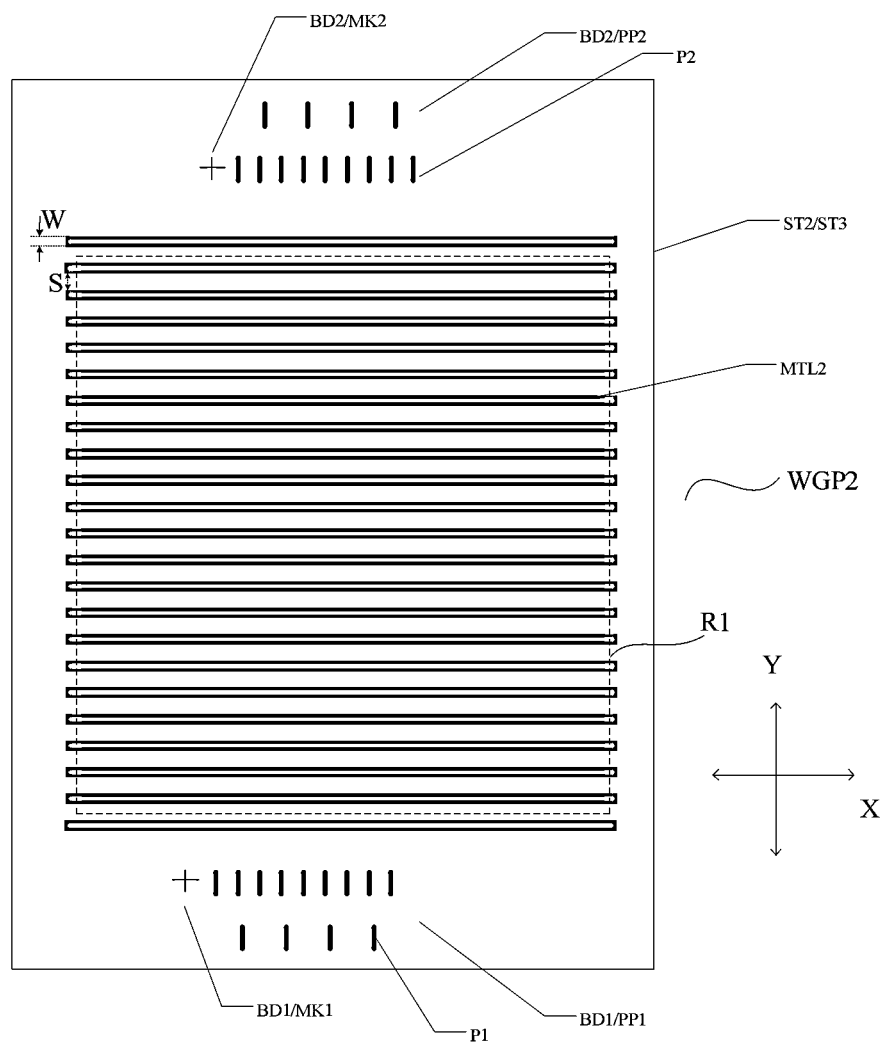
FIG. 6 is a plan view of a display panel provided by an embodiment of the present disclosure.

FIG. 6 is a plan view of a display panel provided by an embodiment of the present disclosure. Referring to FIG. 6 and FIG. 5, the second wire grid polarizer WGP2 includes a plurality of second metal wires MTL2, the plurality of second metal wires MTL2 are parallel with each other. For example, a width of each second metal wire MTL2 is in nanoscale, and a spacing between two adjacent second metal wires MTL2 is in nanoscale. Each second metal wire MTL2 extends in the first direction X, and the plurality of second metal wires MTL2 are arranged in the second direction Y. Of the light incident on the second wire grid polarizer WGP2, light parallel with an extending direction of the second metal wire MTL2 is reflected, and light perpendicular to the extending direction of the second metal wire MTL2 can pass through the second wire grid polarizer WGP2.

For example, in the embodiments of the present disclosure, the first direction X and the second direction Y are directions parallel with a surface of the second display substrate, respectively. For example, the first direction X is perpendicular to the second direction Y.

For example, the second wire grid polarizer WGP2 may be made of a metal material, and the metal material includes but is not limited to aluminum.

For example, as illustrated in FIG. 6, the width W of the second metal wire MTL2 is in a range of 50-75 nm, the spacing S between two adjacent second metal wires MTL2 is in a range of 50-75 nm, and the height of the second metal wire MTL2 is in a range of 150-250 nm. Under the condition of these parameters, the polarization degree of the second wire grid polarizer WGP2 can reach 99.87%.

For example, the width W of the second metal wire MTL2 is 68 nm, the spacing S between two adjacent second metal wires MTL2 is 73 nm, and the height of the second metal wire MTL2 is 178 nm.

For example, the width of the second metal wire MTL2 is a size of the second metal wire MTL2 in the second direction Y, and the spacing S between two adjacent second metal wires MTL2 is a spacing between two adjacent second metal wires MTL2 in the second direction Y. For example, the height of the second metal wire MTL2 is a size of the second metal wire MTL2 in the direction perpendicular to the second display substrate ST2.

For example, as illustrated in FIG. 6, in order to obtain a better polarization effect, the second wire grid polarizer WGP2 goes beyond a display region R1 of the display panel. In FIG. 6, the display region R1 is illustrated by a dashed box. For example, the second wire grid polarizer WGP2 goes beyond an edge of the display region R1 of the display panel by at least 50 μm. For example, as illustrated in FIG. 6, the second wire grid polarizer WGP2 goes beyond edges of the display region R1 of the display panel by at least 50 μm in the four directions of up, down, left and right.

Figure 7:
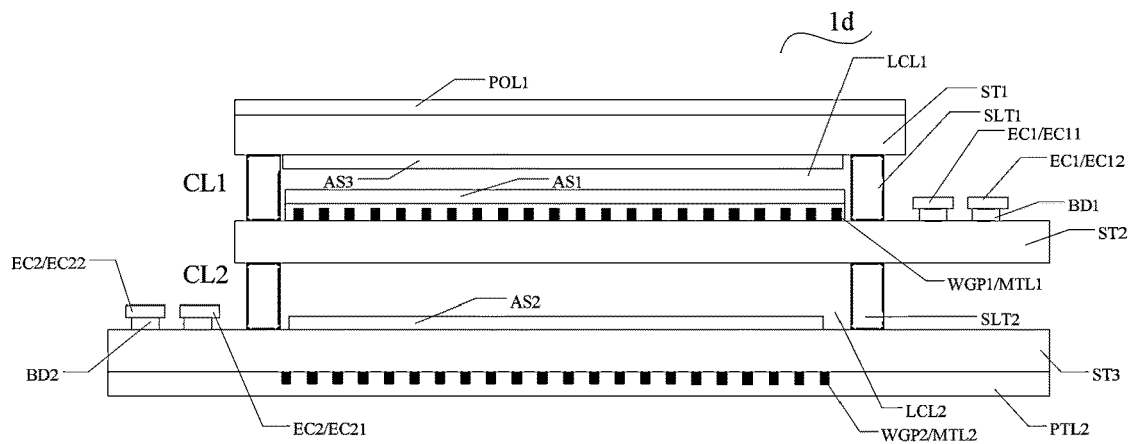
FIG. 7 is a schematic diagram of a display panel provided by an embodiment of the present disclosure.

FIG. 7 is a schematic diagram of a display panel provided by an embodiment of the present disclosure. The display panel 1d illustrated in FIG. 7 is different from the display panel 1b illustrated in FIG. 4 in that a second wire grid polarizer WGP2 is adopted to replace the polarizer POL2.

For example, the second bonding portion BD2 and the first bonding portion BD1 can also be located at the same side of the first liquid crystal cell CL1.

Figure 8:
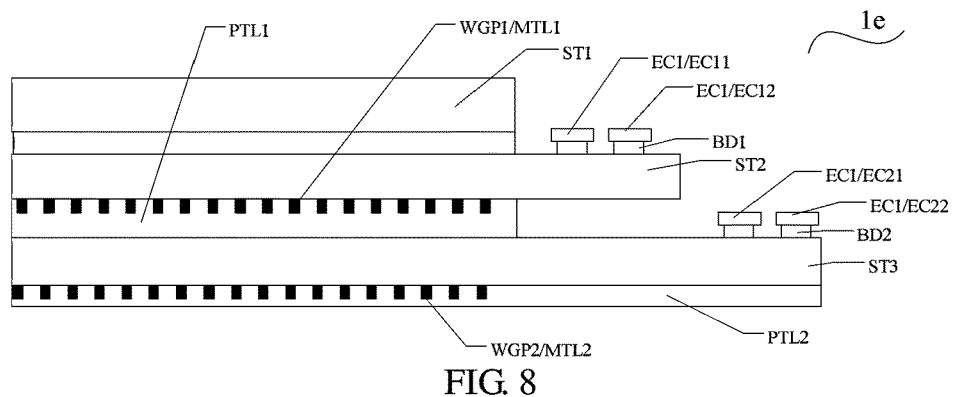
FIG. 8 is a side view of a display panel provided by an embodiment of the present disclosure.

FIG. 8 is a side view of a display panel provided by an embodiment of the present disclosure. The display panel 1e illustrated in FIG. 8 differs from the display panel 1c illustrated in FIG. 5 in that the second bonding portion BD2 and the first bonding portion BD1 are located at the same side of the first liquid crystal cell CL1.

As illustrated in FIG. 8, an orthographic projection of the first wire grid polarizer WGP1 on the second display substrate ST2 is not overlapped with an orthographic projection of the first bonding portion BD1 on the second display substrate ST2, so as to facilitate the bonding of the first external circuit EC1 to the second display substrate ST2. As illustrated in FIG. 8, an orthographic projection of the second wire grid polarizer WGP2 on the second display substrate ST2 is not overlapped with an orthographic projection of the first bonding portion BD1 on the second display substrate ST2, so as to facilitate the bonding of the first external circuit EC1 to the second display substrate ST2.

As illustrated in FIG. 8, an orthographic projection of the first wire grid polarizer WGP1 on the third display substrate ST3 is not overlapped with an orthographic projection of the second bonding portion BD2 on the third display substrate ST3, so as to facilitate the bonding of the second external circuit EC2 to the third display substrate ST3. As illustrated in FIG. 8, an orthographic projection of the second wire grid polarizer WGP2 on the third display substrate ST3 is not overlapped with an orthographic projection of the second bonding portion BD2 on the third display substrate ST3, so as to facilitate the bonding of the second external circuit EC2 to the third display substrate ST3.

Figure 9:
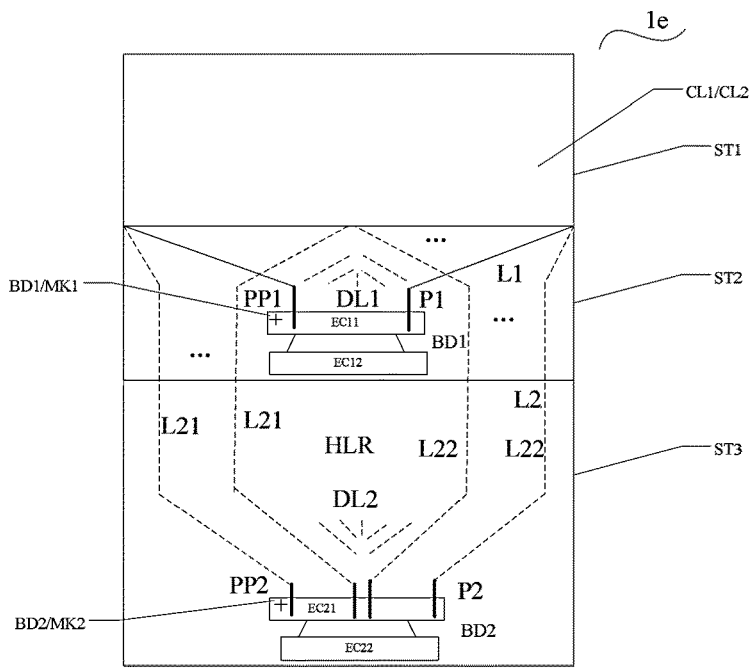
FIG. 9 is a plan view of a display panel provided by an embodiment of the present disclosure.

FIG. 9 is a plan view of a display panel provided by an embodiment of the present disclosure. For example, as illustrated in FIG. 9, an orthographic projection of the first bonding portion BD1 on the third display substrate ST3 is located at a side of an orthographic projection of the second bonding portion BD2 on the third display substrate ST3 close to the second liquid crystal cell CL2. For example, referring to FIG. 9 and FIG. 8, an orthographic projection of the second bonding portion BD2 on the third display substrate ST3 is not overlapped with an orthographic projection of the first bonding portion BD1 on the third display substrate ST3.

As illustrated in FIG. 9, the first bonding portion BD1 includes a first pad portion PP1 and a first alignment mark MK1, and the second bonding portion BD2 includes a second pad portion PP2 and a second alignment mark MK2.

As illustrated in FIG. 9, the first pad portion PP1 includes a plurality of first pads P1, the second pad portion PP2 includes a plurality of second pads P2, and an orthographic projection of the plurality of first pads P1 on the third display substrate ST3 is not overlapped with an orthographic projection of the plurality of second pads P2 on the third display substrate ST3. Therefore, this arrangement can have no impact on the identification of the first alignment mark of the first liquid crystal cell CL1 and the second alignment mark of the second liquid crystal cell CL2, have no physical interference to occur in the bonding process, and have no impact on confirmation of the bonding effect of the first liquid crystal cell CL1 and the second liquid crystal cell CL2.

As illustrated in FIG. 9, the plurality of first pads P1 are located on the second display substrate ST2, the plurality of second pads P2 are located on the third display substrate ST3, and an orthographic projection of the plurality of first pads P1 on the third display substrate ST3 is not overlapped with an orthographic projection of the plurality of second pads P2 on the third display substrate ST3. Only two first pads P1 and four second pads P2 are illustrated in FIG. 9, but the number of first pads P1 and the number of second pads P2 are not limited to those illustrated in FIG. 9.

As illustrated in FIG. 9, in order to avoid physical interference, the orthographic projection of the plurality of second pads P2 on the third display substrate ST3 is located outside the orthographic projection of the second display substrate ST2 on the third display substrate ST3.

For example, as illustrated in FIG. 9, the orthographic projection of the plurality of first pads P1 on the third display substrate ST3 is located at a side of the orthographic projection of the plurality of second pads P2 on the third display substrate ST3 close to the second liquid crystal cell CL2, thereby facilitating the manufacture of the peripheral wiring of the first liquid crystal cell CL1 and the second liquid crystal cell CL2.

For example, as illustrated in FIG. 9, one part of the plurality of second pads P2 are connected with the second liquid crystal cell CL2 through a plurality of first wires L21, respectively, another part of the plurality of second pads P2 are connected with the second liquid crystal cell CL2 through a plurality of second wires L22, respectively, a blank region HLR is provided between the plurality of first wires L21 and the plurality of second wires L22, and the plurality of first pads P1 are located in the blank region HLR. For example, the blank region HLR refers to that the first wires L21 and the second wires L22 are not provided in the region, and a part of a film layer in the region is removed, the film layer is used for forming the first wires L21 and the second wires L22.

In the embodiment illustrated in FIG. 9, the wires L2 connected with the second pads P2 are illustrated in dashed lines, so as to be distinguished from the wires L1 connected with the first pads P1. The wires L1 connected with the first pads P1 are indicated by solid lines. FIG. 9 illustrates the wires connected with two first pads P1. The wires L1 connected with the first pads P1 are indicated by solid lines. The number of first pads P1 and the number of second pads P2 are not limited to those illustrated in FIG. 9.

FIG. 9 further illustrates a plurality of first dummy wires DL1 and a plurality of second dummy wires DL2. The arrangement of the plurality of first dummy wires DL1 and the plurality of second dummy wires DL2 facilitates the formation of wires respectively connected with the plurality of second pads P2. The plurality of first dummy wires DL1 are disposed opposite to the plurality of second dummy wires, and the plurality of first dummy wires DL1 are closer to the second liquid crystal cell CL2 than the plurality of second dummy wires DL2.

As illustrated in FIG. 9, the first alignment mark MK1 is located in the blank region HLR, thereby avoiding physical interference and avoiding the impact on alignment.

For example, in the embodiments of the present disclosure, the first external circuit EC1 includes a first integrated circuit EC11 and a first flexible printed circuit board EC12, and the second external circuit EC2 includes a second integrated circuit EC21 and a second flexible printed circuit board EC22. The first integrated circuit EC11 and the first flexible printed circuit board EC12 are bonded onto the second display substrate ST2, and the first integrated circuit EC11 cooperates with the first flexible printed circuit board EC12 to control the first liquid crystal cell CL1. The second integrated circuit EC21 and the second flexible printed circuit board EC22 are bonded onto the third display substrate ST3, and the second integrated circuit EC21 cooperates with the second flexible printed circuit board EC22 to control the second liquid crystal cell CL2.

Figure 10:
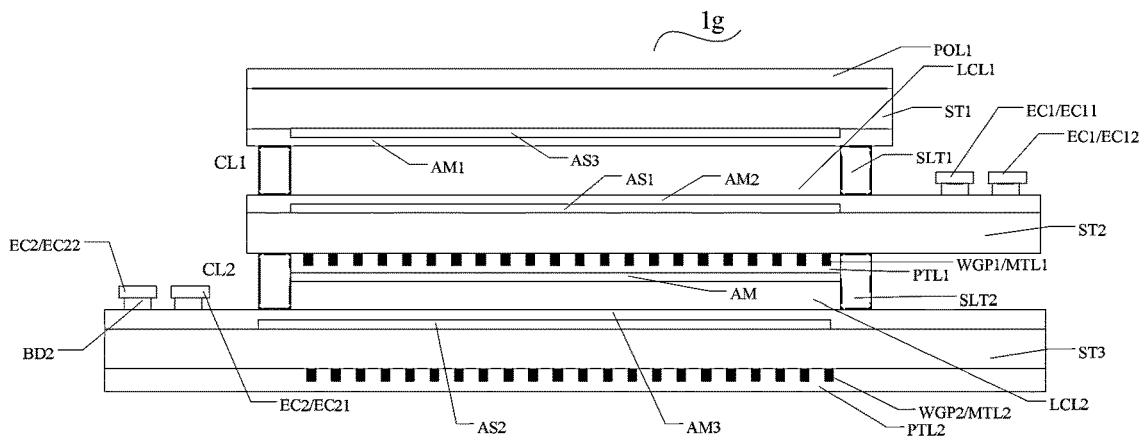
FIG. 10 is a cross-sectional view of a display panel provided by an embodiment of the present disclosure.

FIG. 10 is a cross-sectional view of a display panel provided by an embodiment of the present disclosure. For example, in the display panel 1g illustrated in FIG. 10, an alignment layer AM is provided at the side of the second display substrate ST2 of the second liquid crystal cell CL2 away from the first liquid crystal cell CL1, and the alignment layer AM is configured to adjust a pre-tilt angle of the liquid crystal molecule in the second liquid crystal layer LCL2. For example, a formation temperature of the alignment layer is less than or equal to 130° C. In the case where the first liquid crystal cell CL1 is firstly formed and the first wire grid polarizer WGP1 is then formed at the side of the second display substrate ST2 away from the first display substrate ST1, the alignment layer AM is formed at a relatively low temperature so that the formation temperature of the alignment layer AM does not affect the quality of the first liquid crystal cell CL1. For example, a material of the alignment layer AM includes polyimide. For example, in the display panel 1g illustrated in FIG. 10, a protective layer PTL1 may be further provided between the alignment layer AM and the first wire grid polarizer WGP1. The arrangement of the protective layer can be referred to the protective layer PTL1 in FIG. 2, the protective layer PTL1 covers the first wire grid polarizer WGP1, and the alignment layer AM is provided at the side of the protective layer PTL1 away from the first display substrate ST1.

For example, in the embodiment of the present disclosure, as illustrated in FIG. 10, an alignment layer AM1 is further provided at a side of the first display substrate ST1 close to the second display substrate ST2, an alignment layer AM2 is further provided at a side of the second display substrate ST2 close to the first display substrate ST1, and an alignment layer AM3 is further provided at a side of the third display substrate ST3 close to the second display substrate ST2. The alignment layer AM1 and the alignment layer AM2 are configured to adjust a pre-tilt angle of the liquid crystal molecule in the first liquid crystal layer LCL1. The alignment layer AM and the alignment layer AM3 are configured to adjust a pre-tilt angle of the liquid crystal molecule in the second liquid crystal layer LCL2.

As illustrated in FIG. 10, a polarizer POL1 is attached to a side of the first display substrate ST1 away from the second display substrate ST2. For example, a direction of a light transmission axis of the polarizer POL1 is the same as a direction of a light transmission axis of the second wire grid polarizer WGP2. For example, the direction of the light transmission axis of the second wire grid polarizer WGP2 is perpendicular to the direction of the light transmission axis of the first wire grid polarizer WGP1, but is not limited thereto.

For example, as illustrated in FIG. 2, FIG. 4, FIG. 5, FIG. 7 and FIG. 10, a first array structure AS1 is provided at a side of the second display substrate ST2 close to the first display substrate ST1, a second array structure AS2 is provided at a side of the third display substrate ST3 close to the second display substrate ST2, and a third array structure AS3 is provided at a side of the first display substrate ST1 close to the second display substrate ST2. For example, the first array structure AS1 includes a first electrode structure for controlling rotation of liquid crystal molecules in the first liquid crystal layer LCL1, the second array structure AS2 includes a second electrode structure for controlling rotation of liquid crystal molecules in the second liquid crystal layer LCL2, and the third array structure AS3 includes a black matrix and a color filter layer. For example, the second display substrate ST2 is a display array substrate, the third display substrate ST3 is a dimming array substrate, and the first display substrate ST1 is a color filter substrate, without limited thereto.

Referring to FIG. 2, FIG. 4, FIG. 5, FIG. 7 and FIG. 10, an orthographic projection of the first wire grid polarizer WGP1 on the second display substrate ST2 is not overlapped with an orthographic projection of the first sealant SLT1 on the second display substrate ST2.

For example, referring to FIG. 2, FIG. 4, FIG. 5, FIG. 7 and FIG. 10, the first bonding portion BD1 is located outside the first liquid crystal cell CL1, which refers to that the first bonding portion BD1 is located at an outer side of the first sealant SLT1 for forming the first liquid crystal cell CL1. For example, referring to FIG. 2, FIG. 4, FIG. 5, FIG. 7 and FIG. 10, the second bonding portion BD2 is located outside the second liquid crystal cell CL2, which refers to that the second bonding portion BD2 is located at an outer side of the second sealant SLT2 for forming the second liquid crystal cell CL2.

At least one embodiment of the present disclosure further provides a display device, which includes any one of the above display panels.

Figure 11:
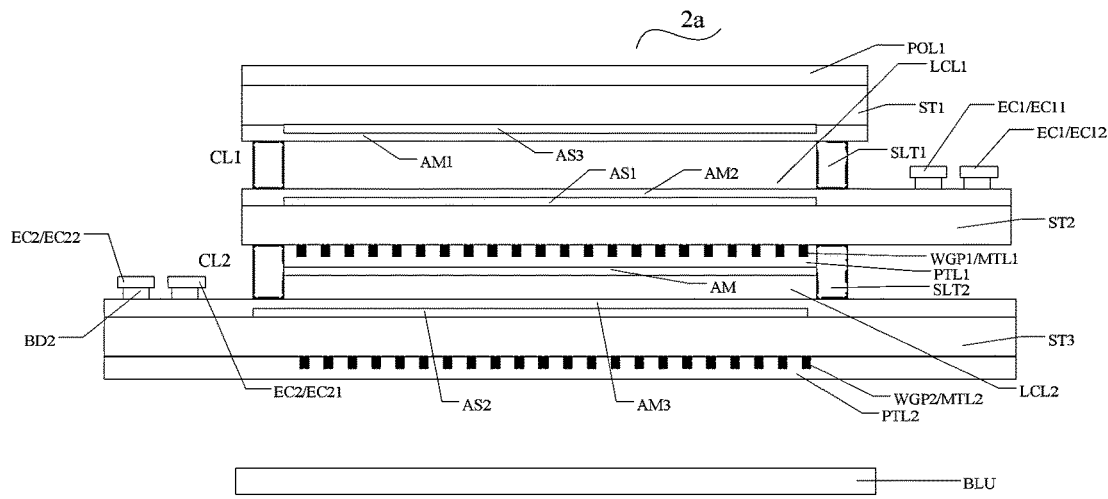
FIG. 11 is a schematic diagram of a display device provided by an embodiment of the present disclosure.

FIG. 11 is a schematic diagram of a display device provided by an embodiment of the present disclosure. The display device 2a illustrated in FIG. 11 will be described with reference to the case where the display panel is the display panel 1g illustrated in FIG. 10, by way of example. Of course, other display panels described above can also be adopted. As illustrated in FIG. 11, the display device 2a further includes a backlight unit BLU. As illustrated in FIG. 11, the backlight unit BLU is located at a side of the third display substrate ST3 away from the second display substrate ST2.

Figure 12:
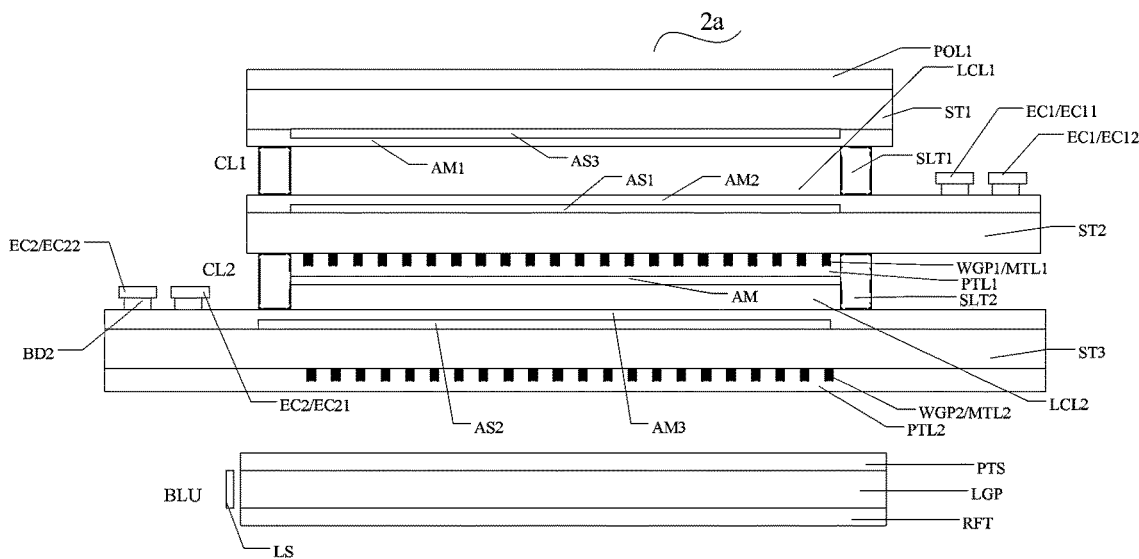
FIG. 12 is a cross-sectional view of a display device provided by an embodiment of the present disclosure.

FIG. 12 is a cross-sectional view of a display device provided by an embodiment of the present disclosure. The display device 2b illustrated in FIG. 12 illustrates a structure of a backlight unit BLU. As illustrated in FIG. 12, the backlight unit BLU includes a light guide plate LGP, an optical film PTS, a reflection sheet RFT, and a light source LS. The light source LS is located at a side surface of the light guide plate LGP. The optical film PTS is located at a side of the light guide plate LGP close to the display panel, and the reflection sheet RFT is located at a side of the light guide plate LGP away from the display panel. For example, the optical film PTS includes at least one selected from the group consisting of a diffusion sheet, a prism sheet, and a brightness enhancement film. The light source LS may adopt an LED, but is not limited thereto.

The light reflected by the first wire grid polarizer WGP1 and the second wire grid polarizer WGP2 reaches the reflection sheet RFT, is depolarized by the reflection sheet RFT, and then is reflected back to the display panel to be utilized, thereby further improving the transmittance of the display device.

As illustrated in FIG. 12, in the display device 2b, a first array structure AS1 is provided at a side of the second display substrate ST2 close to the first display substrate ST1, the first array structure AS1 includes a plurality of display sub-pixels, and each display sub-pixel includes a first electrode and a second electrode which generate an electric field that controls rotation of liquid crystal molecules in the first liquid crystal layer LCL1; the first electrode and the second electrode may both be located on the second display substrate ST2 to form a multi-dimensional electric field, but are not limited thereto. A second array structure AS2 is provided at a side of the third display substrate ST3 close to the second display substrate ST2, and the second array structure AS2 includes a plurality of dimming sub-pixels, each dimming sub-pixel includes a third electrode and a fourth electrode which generate an electric field that controls the rotation of liquid crystal molecules in the second liquid crystal layer LCL2. The third electrode and the fourth electrode may both be located on the third display substrate ST3 to form a multi-dimensional electric field, but are not limited thereto. For example, in order to improve the display quality, a resolution of the first liquid crystal cell CL1 is greater than that of the second liquid crystal cell CL2.

Figure 13:
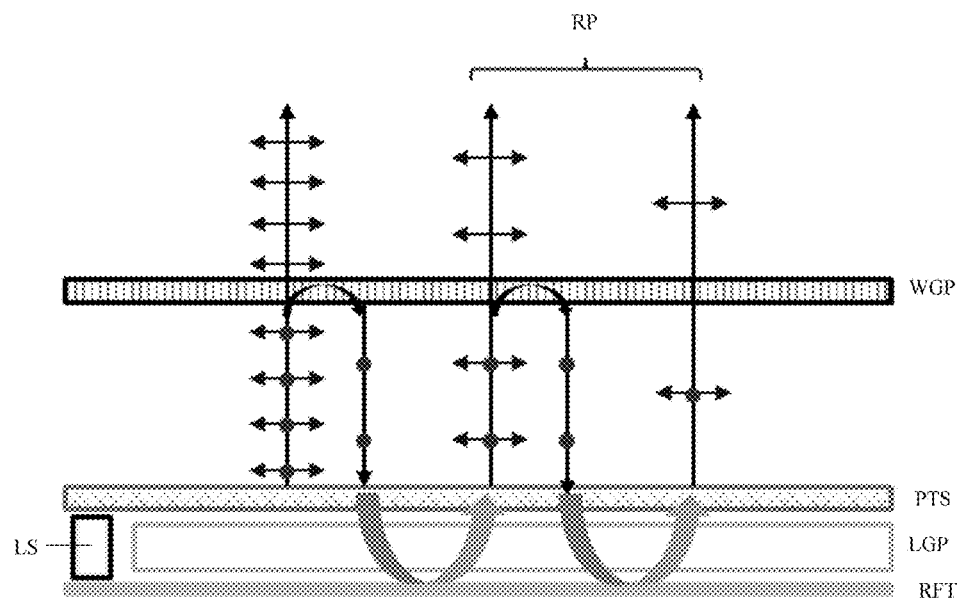
FIG. 13 is a schematic diagram of light reflected by a wire grid polarizer being reused in a display device provided by an embodiment of the present disclosure.

FIG. 13 is a schematic diagram of light reflected by a wire grid polarizer being reused in a display device provided by an embodiment of the present disclosure. The wire grid polarizer WGP includes at least one of the first wire grid polarizer WGP1 or the second wire grid polarizer WGP2. The light reflected by the wire grid polarizer WGP can be depolarized and reflected back to the display panel upon being reflected by the reflection sheet RFT, thereby improving the transmittance of the display device. FIG. 13 illustrates the transmittance-improved portion RP.

At least one embodiment of the present disclosure provides a manufacturing method of a display panel. Referring to FIG. 2, FIG. 4, FIG. 5, FIG. 7 and FIG. 10, the method includes: assembling a first display substrate ST1 with a second display substrate ST2 to form a first liquid crystal cell CL1; and assembling the second display substrate ST2 with a third display substrate ST3 to form a second liquid crystal cell CL2. The manufacturing method of the display panel further includes: forming a first wire grid polarizer WGP1, the first wire grid polarizer WGP1 being formed on the second display substrate ST2; and forming a first bonding portion BD1, the first bonding portion BD1 being formed at a side of the second display substrate ST2 close to the first display substrate ST1 and is located outside the first liquid crystal cell CL1. An orthographic projection of the first wire grid polarizer WGP1 on the second display substrate ST2 is not overlapped with an orthographic projection of the first bonding portion BD1 on the second display substrate ST2.

For example, the forming the first wire grid polarizer includes: forming a first metal film on the second display substrate; patterning the first metal film to form a first metal pattern, the first metal pattern going beyond an edge of a display region of the display panel by at least 50 μm; and patterning the first metal pattern in a nano-imprint manner to form the first wire grid polarizer.

For example, referring to FIG. 2, FIG. 5, FIG. 8 and FIG. 10, after assembling the first display substrate ST1 with the second display substrate ST2 to form the first liquid crystal cell CL1, forming the first wire grid polarizer WGP1 on the second display substrate ST2, and the first wire grid polarizer WGP1 is formed at a side of the second display substrate ST2 away from the first display substrate ST1.

For example, referring to FIG. 2, FIG. 4, FIG. 5, FIG. 7 and FIG. 10, the second bonding portion BD2 and the first bonding portion BD1 are disposed at opposite sides of the first liquid crystal cell CL1.

For example, referring to FIG. 3, FIG. 6 and FIG. 9, the first bonding portion BD1 includes a first pad portion PP1 and an alignment mark MK1, the first pad portion PP1 is configured to be connected with a first external circuit EC1, and the first alignment mark MK1 is configured to align the first pad portion PP1 with the first external circuit EC1 in a bonding process.

For example, referring to FIG. 5, FIG. 7, FIG. 8, and FIG. 10, the manufacturing method further includes forming a second wire grid polarizer WGP2, the second wire grid polarizer WGP2 is formed at a side of the third display substrate ST3 away from the second display substrate ST2, and an orthographic projection of the second wire grid polarizer WGP2 on the second display substrate ST2 is not overlapped with an orthographic projection of the first bonding portion BD1 on the second display substrate ST2.

For example, referring to FIGS. 2-10, the manufacturing method further includes forming a second bonding portion BD2, the second bonding portion BD2 is formed at a side of the third display substrate ST3 close to the second display substrate ST2 and is located outside the second liquid crystal cell CL2, and an orthographic projection of the second bonding portion BD2 on the third display substrate ST3 is not overlapped with an orthographic projection of the second wire grid polarizer WGP2 on the third display substrate ST3. The orthographic projection of the second bonding portion BD2 on the third display substrate ST3 is not overlapped with an orthographic projection of the first bonding portion BD1 on the third display substrate ST3.

For example, referring to FIG. 3, FIG. 6 and FIG. 9, the second bonding portion BD2 includes a second pad portion PP2 and a second alignment mark MK2, the second pad portion PP2 is configured to be connected with a second external circuit EC2, and the second alignment mark MK2 is configured to align the second pad portion PP2 with the second external circuit EC2 in a bonding process.

For example, referring to FIG. 8 and FIG. 9, the second bonding portion BD2 and the first bonding portion BD1 are formed at the same side of the first liquid crystal cell CL1.

For example, referring to FIG. 8 and FIG. 9, an orthographic projection of the first bonding portion BD1 on the third display substrate ST3 is located at a side of an orthographic projection of the second bonding portion BD2 on the third display substrate ST3 close to the second liquid crystal cell CL2.

For example, referring to FIG. 8 and FIG. 9, the second bonding portion BD2 includes a second pad portion PP2, the second pad portion PP2 includes a plurality of second pads P2, one part of the plurality of second pads P2 are connected with the second liquid crystal cell CL2 through a plurality of first wires L21, respectively, another part of the plurality of second pads P2 are connected with the second liquid crystal cell CL2 through a plurality of second wires L22, respectively, a blank region HLR is provided between the plurality of first wires L21 and the plurality of second wires L22, and the first bonding portion BD1 is located in the blank region HLR.

For example, referring to FIG. 8 and FIG. 9, an orthographic projection of the second pad portion PP2 on the third display substrate ST3 is not overlapped with an orthographic projection of the second display substrate ST2 on the third display substrate ST3.

For example, referring to FIG. 2, FIG. 4, FIG. 5, FIG. 7 and FIG. 10, the forming the first liquid crystal cell CL1 includes forming a first liquid crystal layer LCL1 in the first liquid crystal cell CL1, the forming the second liquid crystal cell CL2 includes forming a second liquid crystal layer LCL2 in the second liquid crystal cell CL2, and at least one of the first liquid crystal layer LCL1 or the second liquid crystal layer LCL2 adopts a negative liquid crystal material.

For example, referring to FIG. 2, FIG. 4, FIG. 5, FIG. 7 and FIG. 10, the forming the first liquid crystal cell CL1 includes oppositely arranging the first display substrate ST1 and the second display substrate ST2 and sealing a space between the first display substrate ST1 and the second display substrate ST2, and the forming the second liquid crystal cell CL2 includes oppositely arranging the second display substrate ST2 and the third display substrate ST3 and sealing a space between the second display substrate ST2 and the third display substrate ST3.

For example, referring to FIG. 2, FIG. 5, FIG. 7, FIG. 8 and FIG. 10, the manufacturing method includes: forming the first liquid crystal cell CL1 before forming the first wire grid polarizer WGP1 on the second display substrate ST2. The first wire grid polarizer WGP1 is formed at a side of the second display substrate ST2 of the first liquid crystal cell CL1 away from the first display substrate ST1.

For example, the manufacturing method further includes: forming a sealed space between the first display substrate ST1 and the second display substrate ST2 to seal the first liquid crystal cell CL1 before forming the first wire grid polarizer WGP1.

For example, referring to FIG. 2, FIG. 4, FIG. 5, FIG. 7 and FIG. 10, the forming the first liquid crystal cell CL1 includes: forming a first sealant SLT1 between the first display substrate ST1 and the second display substrate ST2 to seal a space therebetween to form the first liquid crystal cell CL1, and forming a dummy sealant DSLT located at an outer side of the first sealant SLT1, which is located between the first display substrate ST1 and the second display substrate ST2, to form a sealed space that is located outside the first liquid crystal cell CL1. For example, the first sealant SLT1 and the dummy sealant DSLT are formed in the same patterning process.

For example, the forming the first wire grid polarizer WGP1 includes: cleaning the first display substrate ST1 and the second display substrate ST2 that are provided with the sealed space. The formation of the dummy sealant DSLT can avoid damaging the first liquid crystal cell CL1 and the first bonding part BD1 in the cleaning process.

For example, forming a wire grid polarizer includes: forming a metal film, patterning the metal film to form a metal pattern, and performing a treatment on the metal pattern by a nano-imprint process to form the wire grid polarizer. The first wire grid polarizer WGP1 and the second wire grid polarizer WGP2 can be formed by the above-mentioned method of forming the wire grid polarizer.

For example, performing the treatment on the metal pattern by the nano-imprint process includes: forming an intermediate mask layer on the metal pattern, forming an imprint film on the intermediate mask layer, processing the imprint film to form a nano template which includes a plurality of nanowires, dry etching the intermediate mask layer and the metal film with the nano template as a mask, and removing the nano template and the retained intermediate mask layer to form a wire grid polarizer. For example, during dry etching, the flow rate of protective nitrogen can be increased to improve the morphology of the wire grid polarizer.

Figure 14A:
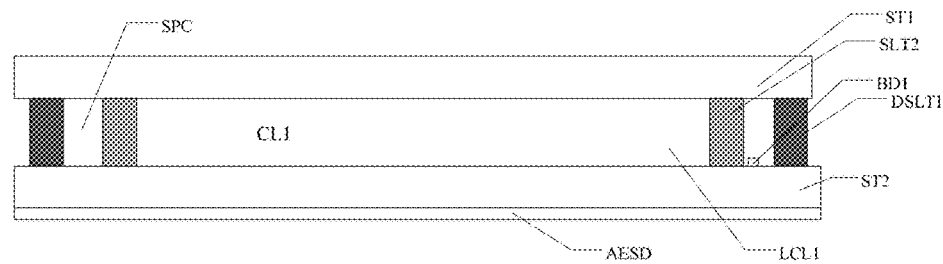
FIG. 14A is a schematic diagram of forming a first liquid crystal cell and a sealed space in a manufacturing method of a display panel provided by an embodiment of the present disclosure.
Figure 14B:
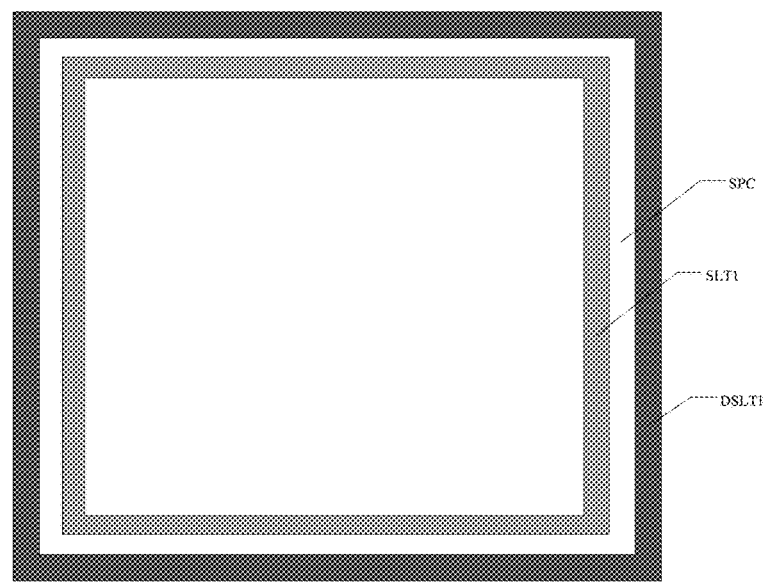
FIG. 14B is a schematic diagram of a first sealant, a dummy sealant and a sealed space formed in a manufacturing method of a display panel provided by an embodiment of the present disclosure.

For example, the forming the first liquid crystal cell CL1 includes: forming a first sealant SLT1 between the first display substrate ST1 and the second display substrate ST2 to seal a space therebetween to form the first liquid crystal cell CL1, and forming a dummy sealant DSLT located at an outer side of the first sealant SLT1, which is located between the first display substrate ST1 and the second display substrate ST2 (as illustrated in FIG. 14A and FIG. 14B), to form a sealed space that is located outside the first liquid crystal cell CL1. For example, the first sealant SLT1 and the dummy sealant DSLT are formed in the same patterning process.

For example, referring to FIG. 2, FIG. 5 and FIG. 10, the manufacturing method further includes forming a protective layer PTL1 at a side of the second display substrate ST2 of the second liquid crystal cell CL2 away from the first liquid crystal cell CL1, so as to avoid bubble defect after the assembling process. The protective layer is made of optical clear adhesive.

For example, the manufacturing method includes: after forming the first wire grid polarizer WGP1 on the second display substrate ST2, assembling a side of the second display substrate ST2, on which the first wire grid polarizer WGP1 is not provided, with the first display substrate ST1 to form the first liquid crystal cell CL1.

For example, the manufacturing method further includes: after forming the first liquid crystal cell CL1 and forming the first wire grid polarizer WGP1, assembling a side of the second display substrate ST2, on which the first wire grid polarizer WGP1 is provided, with the third display substrate ST3 to form a second liquid crystal cell CL2.

For example, referring to FIG. 3, FIG. 6 and FIG. 9, the manufacturing method further includes: forming a plurality of first pads P1 on a portion of the second display substrate ST2 located outside the first liquid crystal cell CL1; forming a plurality of second pads P2 on a portion of the third display substrate ST3 located outside the second liquid crystal cell CL2, an orthographic projection of the plurality of first pads P1 on the third display substrate ST3 is not overlapped with an orthographic projection of the plurality of second pads P2 on the third display substrate ST3.

Figure 19:
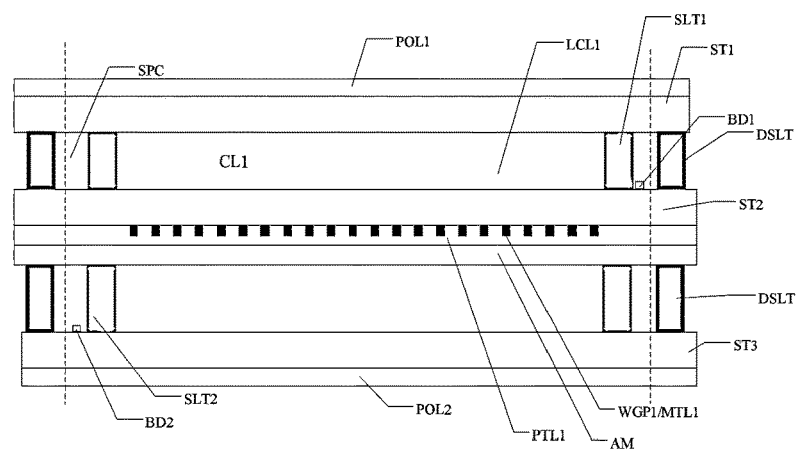
FIG. 19 is a schematic diagram of cutting a first display substrate, a second display substrate, and a third display substrate in a manufacturing method of a display panel provided by an embodiment of the present disclosure.

For example, referring to FIG. 8 and FIG. 19, the orthographic projection of the plurality of first pads P1 on the third display substrate ST3 is located at a side of the orthographic projection of the plurality of second pads P2 on the third display substrate ST3 close to the second liquid crystal cell CL2.

For example, referring to FIG. 8 and FIG. 19, one part of the plurality of second pads P2 are connected with the second liquid crystal cell CL2 through a plurality of first wires L21, respectively, another part of the plurality of second pads P2 are connected with the second liquid crystal cell CL2 through a plurality of second wires L22, respectively, a blank region HLR is provided between the plurality of first wires L21 and the plurality of second wires L22, and the plurality of first pads P1 are located in the blank region HLR.

Figure 15:
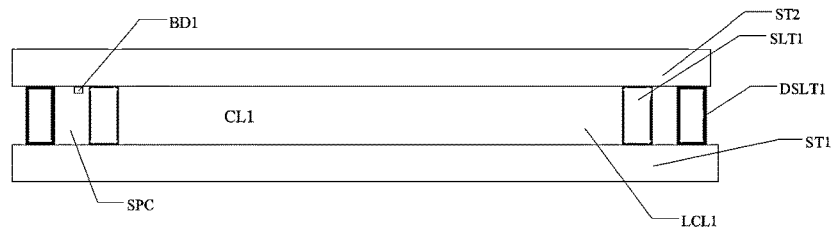
FIG. 15 is a schematic diagram of removing an anti-static protective layer in a manufacturing method of a display panel provided by an embodiment of the present disclosure.
Figure 17:
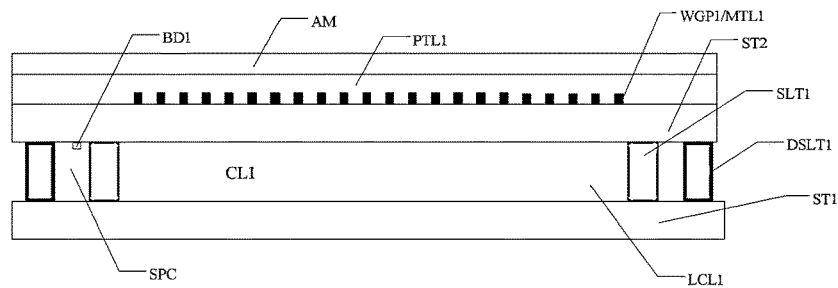
FIG. 17 is a schematic diagram of forming a protective layer and an alignment layer on a first wire grid polarizer in a manufacturing method of a display panel provided by an embodiment of the present disclosure.
Figure 18:
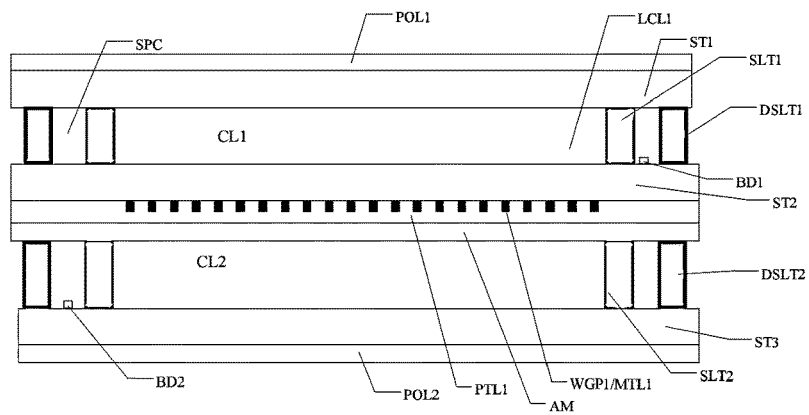
FIG. 18 is a schematic diagram of assembling a second display substrate of a first liquid crystal cell with a third display substrate to form a cell in a manufacturing method of a display panel provided by an embodiment of the present disclosure.

FIG. 14A is a schematic diagram of forming a first liquid crystal cell and a sealed space in a manufacturing method of a display panel provided by an embodiment of the present disclosure. FIG. 14B is a schematic diagram of a first sealant, a dummy sealant, and a sealed space that are formed in a manufacturing method of a display panel provided by an embodiment of the present disclosure. FIG. 15 is a schematic diagram of removing an anti-static protective layer in a manufacturing method of a display panel provided by an embodiment of the present disclosure. FIGS. 16A-16E are schematic diagrams of forming a first wire grid polarizer on a second display substrate of a first liquid crystal cell in a manufacturing method of a display panel provided by an embodiment of the present disclosure. FIG. 17 is a schematic diagram of forming a protective layer and an alignment layer on a first wire grid polarizer in a manufacturing method of a display panel provided by an embodiment of the present disclosure. FIG. 18 is a schematic diagram of assembling a second display substrate of a first liquid crystal cell with a third display substrate to form a cell in a manufacturing method of a display panel provided by an embodiment of the present disclosure. FIG. 19 is a schematic diagram of cutting a first display substrate, a second display substrate, and a third display substrate in a manufacturing method of a display panel provided by an embodiment of the present disclosure.

The manufacturing method of the display panel provided by an embodiment of the present disclosure includes the following steps.

S11. As illustrated in FIG. 14A, firstly, assembling a first display substrate ST1 with a second display substrate ST2 to form a first liquid crystal cell CL1, and forming a sealed space SPC between the first display substrate ST1 and the second display substrate ST2 to seal the first liquid crystal cell CL1.

Before the assembling, an anti-static protective layer AEAD is provided at a side of the second display substrate ST2 away from the first display substrate ST1, and the anti-static protective layer is provided to play an anti-static role in the process of forming an array structure on the second display substrate ST2.

For example, the forming the first liquid crystal cell CL1 includes forming a first sealant SLT1 to bond the first display substrate ST1 with the second display substrate ST2 to form the first liquid crystal cell CL1, and forming a dummy sealant DSLT1 located at an outer side of the first sealant SLT1, which is located between the first display substrate ST1 and the second display substrate ST2, to form a sealed space located outside the first liquid crystal cell CL1.

For example, the first sealant SLT1 and the dummy sealant DSLT1 are formed in the same patterning process. As illustrated in FIG. 14A, the dummy sealant SSLT1 is formed at the same time as the first sealant SLT1 to form a sealed space SPC to seal the first liquid crystal cell CL1. The space enclosed by the first display substrate ST1, the second display substrate ST2 and the first sealant SLT1, forms the first liquid crystal cell CL1.

For example, a width of the dummy sealant DSLT1 is in a range of 1.5-5 mm to increase the tightness of the sealed space SPC and not to interfere with the alignment marks at the periphery. Further, for example, the width of the dummy sealant DSLT1 is 3 mm, but is not limited thereto.

Before the assembling, a first bonding portion BD1 is provided at a side of the second display substrate ST2 close to the first display substrate ST1. The first bonding portion BD1 is located outside the first liquid crystal cell CL1 and is located between the first sealant SLT1 and the dummy sealant DSLT1. For example, the first bonding portion BD1 being located outside the first liquid crystal cell CL1 refers to that the first bonding portion BD1 is located at an outer side of the first sealant SLT1 for forming the first liquid crystal cell CL1. As illustrated in FIG. 14A, the first bonding portion BD1 is located in the sealed space SPC. As illustrated in FIG. 14A, the first bonding portion BD1 is located between the first sealant SLT1 and the dummy sealant DSLT1.

FIG. 14B illustrates a plan view of the first sealant SLT1 and the dummy sealant DSLT1. The dummy sealant DSLT1 surrounds the first sealant SLT1, a space between the first sealant SLT1 and the dummy sealant DSLT1 and between the first display substrate ST1 and the second display substrate ST2 forms the sealed space SPC.

S12. As illustrated in FIG. 15, turning over the first liquid crystal cell CL1 so that the second display substrate ST2 is located above the first display substrate ST1, and removing the anti-static protective layer AEAD.

The purpose of the removing the anti-static protective layer AEAD is to prevent a first wire grid polarizer WGP1 subsequently formed from being stripped from the second display substrate ST2.

For example, a polishing process is adopted to remove the anti-static protective layer, and a polishing time is greater than or equal to 3 minutes so as to increase the surface flatness, so that the surface flatness at the edge position meets the process requirements. For example, the removing the anti-static protective layer by polishing can make a surface roughness of the second display substrate ST2 less than 10 nm, without limited thereto.

For example, referring to FIG. 14A and FIG. 15, before assembling the first display substrate ST1 with the second display substrate ST2 to form the first liquid crystal cell CL1, the manufacturing method further includes forming an anti-static protective layer AEAD at a side of the second display substrate ST2, and after assembling the first display substrate ST1 with the second display substrate ST2 to form the first liquid crystal cell CL1 and before forming the first wire grid polarizer WGP1, the manufacturing method further includes removing the anti-static protective layer AEAD.

S13. As illustrated in FIGS. 16A to 16E, forming a first wire grid polarizer WGP1 at a side of the second display substrate ST2 of the first liquid crystal cell CL1 away from the first display substrate ST1.

For example, the forming the first wire grid polarizer WGP1 includes cleaning the first display substrate ST1 and the second display substrate ST2 that are provided with the sealed space SPC. Due to the arrangement of the sealed space SPC, the cleaning process will not affect the components in the sealed space SPC. The cleaning process adopts a wet cleaning method, which includes, for example, cleaning with water or chemical liquid.

Figure 16A:
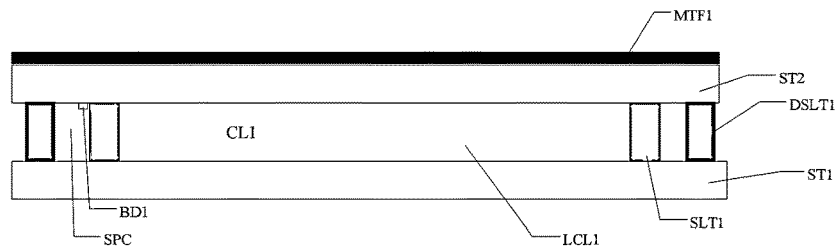
FIGS. 16A-16E are schematic diagrams of forming a first wire grid polarizer on a second display substrate of a first liquid crystal cell in a manufacturing method of a display panel provided by an embodiment of the present disclosure.
Figure 16B:
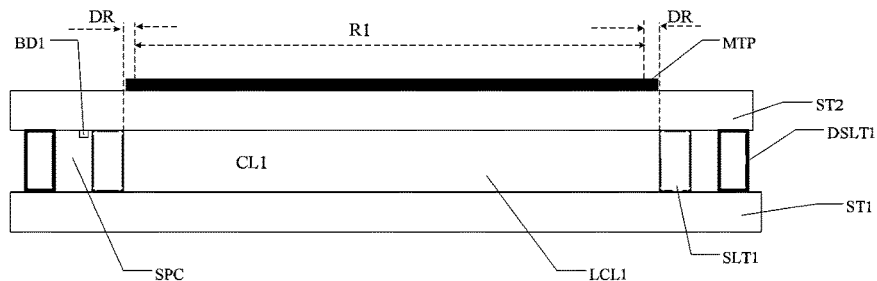

The forming the first wire grid polarizer WGP1 includes: as illustrated in FIG. 16A, forming a first metal thin film MTF1 on the second display substrate ST2; as illustrated in FIG. 16B, patterning the first metal thin film MTF1 to form a first metal pattern MTP; and patterning the first metal pattern MTP to form the first wire grid polarizer WGP1.

As illustrated in FIG. 16B, the first metal pattern MTP goes beyond an edge of a display region R1 of the display panel by at least 50 μm, such that the first wire grid polarizer WGP1 goes beyond the edge of the display region R1 of the display panel by at least 50 μm. FIG. 16B illustrates a display region R1 and dummy regions DR located at both sides of the display region R1. The first metal pattern MTP extends from the display region R1 to the dummy regions DR.

Figure 16C:
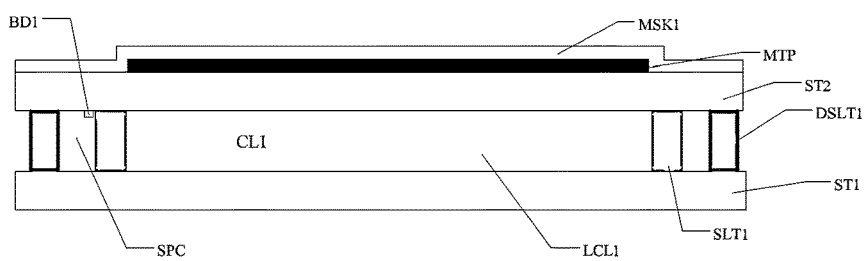
Figure 16D:
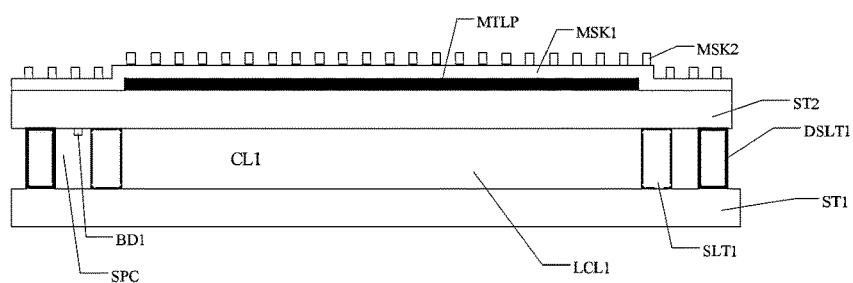
Figure 16E:
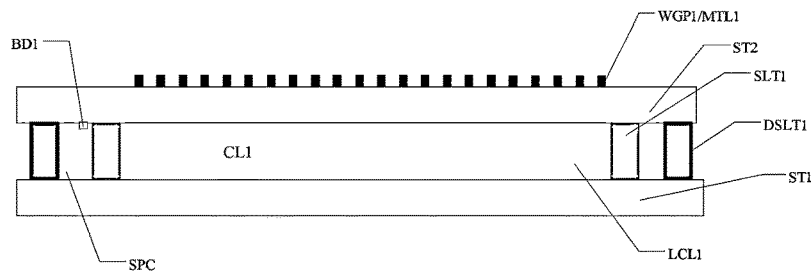

The patterning the first metal pattern to form the first wire grid polarizer WGP1 includes: as illustrated in FIG. 16C, forming an intermediate mask layer MSK1 on the first metal pattern MTP; as illustrated in FIG. 16D, forming a nano template MSK2 on the intermediate mask layer MSK; as illustrated in FIG. 16E, dry etching the first metal pattern MTP and the intermediate mask layer MSK1 with the nano template MSK2 as a mask, and removing the nano template MSK2 and the retained intermediate mask layer.

The reason why the first metal pattern MTP and the intermediate mask layer MSK1 are subjected to the dry etching process with the nano template MSK2 as a mask instead of the wet etching process is that the wet etching process is easy to produce residues, while the dry etching process is not easy to produce residues.

For example, as illustrated in FIG. 16C, a thickness of the intermediate mask layer MSK1 is in a range of 100-200 nm. For example, as illustrated in FIG. 16C, the intermediate mask layer MSK1 may include a silicon oxide layer.

As illustrated in FIG. 16E, an orthographic projection of the first bonding portion BD1 on the second display substrate ST2 is not overlapped with an orthographic projection of the first wire grid polarizer WGP1 on the second display substrate ST2.

S14. As illustrated in FIG. 17, forming a protective layer PTL1 and an alignment layer AM on the first wire grid polarizer WGP1. For example, a formation temperature of the protective layer PTL1 is less than or equal to 130° C., without limited thereto. A material of the protective layer PTL1 includes an optical clear adhesive, and the protective layer PTL1 can be formed at a relatively low temperature. Compared with a protective layer made of a silicon oxide material, the protective layer PTL1 does not generate bubbles after the assembling, thus avoiding bubble defect. The alignment layer AM is formed after forming the protective layer PTL1. For example, a thickness of the protective layer PTL1 is in a range of 1-3 µm. The forming the protective layer PTL1 includes coating an optical clear adhesive film, exposing and curing. The exposing can be performed by using ultraviolet light, and for example, a wavelength of the ultraviolet light is 365 nm, and the curing energy is 200 MJ, without limited thereto. For example, a curing temperature is 120° C. and the curing time is 1 h.

S15. As illustrated in FIG. 18, turning over the first liquid crystal cell CL1 again so that the first display substrate ST1 is located above the second display substrate ST2, assembling the second display substrate ST2 with a third display substrate ST3 to form a second liquid crystal cell CL2, attaching a polarizer POL1 to a side of the first display substrate ST1 away from the second display substrate ST2, and attaching a polarizer POL2 to a side of the third display substrate ST3 away from the second display substrate ST2.

As illustrated in FIG. 18, before assembling the second display substrate ST2 with the third display substrate ST3 to form the second liquid crystal cell CL2, forming a second bonding portion BD2 on the third display substrate ST3, and an orthographic projection of the second bonding portion BD2 on the second display substrate ST2 is not overlapped with an orthographic projection of the first wire grid polarizer WGP1 on the second display substrate ST2. An orthographic projection of the second bonding portion BD2 on the third display substrate ST3 is not overlapped with an orthographic projection of the first bonding portion BD1 on the third display substrate ST3.

S16. As illustrated in FIG. 19, cutting the first display substrate ST1, the second display substrate ST2, and the third display substrate ST3. For example, laser cutting can be adopted to realize the splitting, and a cutting line is located between the first sealant SLT1 and the dummy sealant DSLT1 to form a display panel including the first liquid crystal cell CL1 and the second liquid crystal cell CL2. The dashed line illustrated in FIG. 19 is the cutting line. For example, a part of the film layer at the cutting line should not be provided with black matrix, metal, and resin, etc.

For example, in the case where the first bonding portion BD1 and the second bonding portion BD2 are located at opposite sides of the second liquid crystal cell CL2, the method includes cutting the first display substrate ST2 to expose the first bonding portion BD1, and cutting the first display substrate ST1 and the second display substrate ST2 to expose the second bonding portion BD2.

In the case where the first bonding portion BD1 and the second bonding portion BD2 are located at the same side of the second liquid crystal cell CL2, the method includes cutting the first display substrate ST1 to expose the first bonding portion BD1 (first cut), and cutting the second display substrate ST2 to expose the second bonding portion BD2 (second cut). After bonding a first external circuit EC1 onto the first bonding portion BD1 and bonding a second external circuit EC2 onto the second bonding portion BD2, a display panel can be formed. For example, a distance between the first cut and the second cut is greater than or equal to 3.5 mm due to the physical interference of the glass boundary and the cutter head.

For example, as illustrated in FIG. 19, forming a dummy sealant DSLT2 during forming the second sealant SLT2.

For example, the forming the alignment layer AM includes forming an alignment film, rubbing the alignment film to align the alignment film, and curing the alignment film after being aligned. For example, a curing temperature is less than or equal to 130° C., but is not limited thereto.

Figure 20:
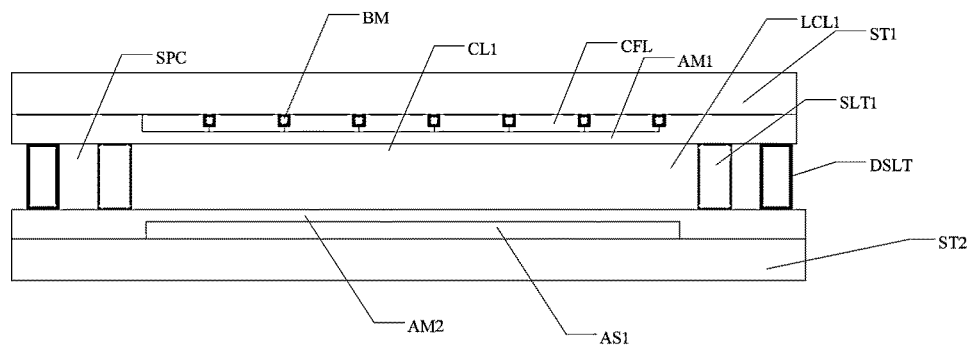
FIG. 20 is a schematic diagram of a first liquid crystal cell formed in a manufacturing method of a display panel provided by an embodiment of the present disclosure.

FIG. 20 is a schematic diagram of a first liquid crystal cell formed in a manufacturing method of a display panel provided by an embodiment of the present disclosure. For example, as illustrated in FIG. 20, forming the first liquid crystal cell CL1 includes forming a black matrix BM, a color filter layer CFL and an alignment layer AM1 on the first display substrate ST1, forming a first array structure AS1 and an alignment layer AM2 on the second display substrate ST2, and assembling the first display substrate ST1 with the second display substrate ST2 to form a cell.

Figure 21:
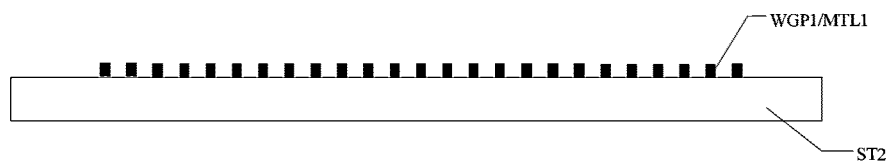
FIG. 21 is a schematic diagram of forming a first wire grid polarizer on a second display substrate in a manufacturing method of a display panel provided by an embodiment of the present disclosure.
Figure 22:
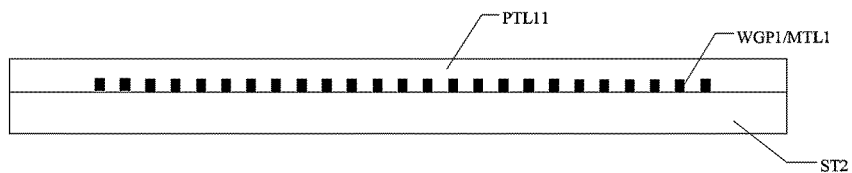
FIG. 22 is a schematic diagram of forming a protective layer on a first wire grid polarizer in a manufacturing method of a display panel provided by an embodiment of the present disclosure.
Figure 23:
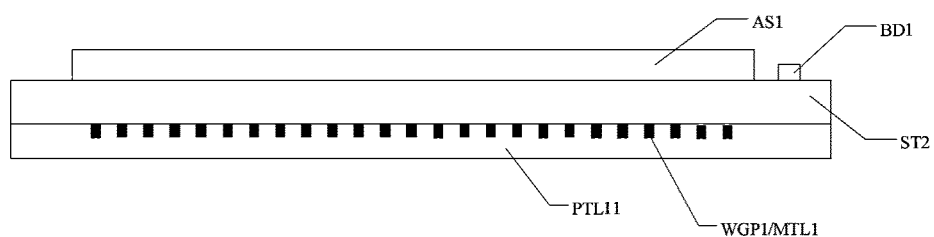
FIG. 23 is a schematic diagram of forming a first array structure at a side of a second display substrate opposite to a side of the second display substrate provided with a first wire grid polarizer in a manufacturing method of a display panel provided by an embodiment of the present disclosure.
Figure 24:
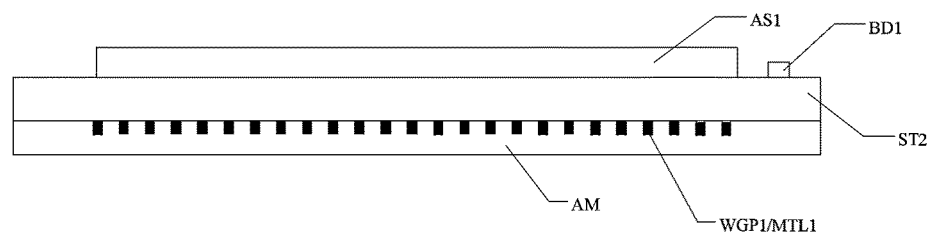
FIG. 24 is a schematic diagram of removing a protective layer and forming an alignment layer in a manufacturing method of a display panel provided by an embodiment of the present disclosure.
Figure 25:
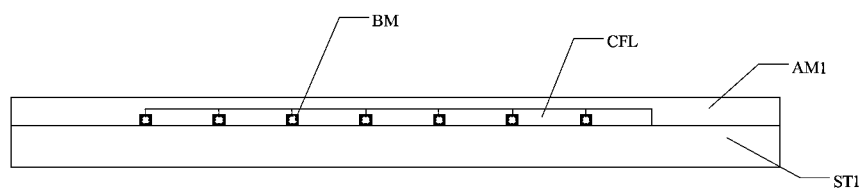
FIG. 25 is a schematic diagram of forming a black matrix, a color filter layer, and an alignment layer on a first display substrate in a manufacturing method of a display panel provided by an embodiment of the present disclosure.
Figure 26:
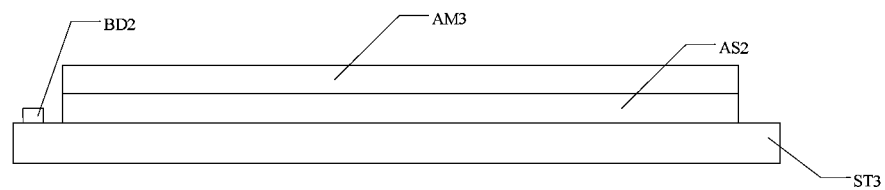
FIG. 26 is a schematic diagram of forming a second array structure and an alignment layer on a third display substrate in a manufacturing method of a display panel provided by an embodiment of the present disclosure.

FIG. 21 is a schematic diagram of forming a first wire grid polarizer on a second display substrate in a manufacturing method of a display panel provided by an embodiment of the present disclosure. FIG. 22 is a schematic diagram of forming a protective layer on a first wire grid polarizer in a manufacturing method of a display panel provided by an embodiment of the present disclosure. FIG. 23 is a schematic diagram of forming a first array structure at a side of a second display substrate opposite to a side of the second display substrate provided with a first wire grid polarizer in a manufacturing method of a display panel provided by an embodiment of the present disclosure. FIG. 24 is a schematic diagram of removing a protective layer and forming an alignment layer in a manufacturing method of a display panel provided by an embodiment of the present disclosure. FIG. 25 is a schematic diagram of forming a black matrix, a color filter layer, and an alignment layer on a first display substrate in a manufacturing method of a display panel provided by an embodiment of the present disclosure. FIG. 26 is a schematic diagram of forming a second array structure and an alignment layer on a third display substrate in a manufacturing method of a display panel provided by an embodiment of the present disclosure.

The manufacturing method of the display panel provided by an embodiment of the present disclosure includes the following steps.

S21. As illustrated in FIG. 21, forming a first wire grid polarizer WGP1 on a second display substrate ST2.

S22. As illustrated in FIG. 22, forming a protective layer PTL11 on the first wire grid polarizer WGP1 to protect the first wire grid polarizer WGP1 in a subsequent process.

S23. As illustrated in FIG. 23, turning over the second display substrate ST2, and forming a first array structure AS1 and a first bonding portion BD1 at a side of the second display substrate ST2 opposite to the side of the second display substrate ST2 provided with the first wire grid polarizer WGP1.

S24. As illustrated in FIG. 24, removing the protective layer PTL11, and forming an alignment layer AM on the first wire grid polarizer WGP1 of the second display substrate ST2.

S25. As illustrated in FIG. 25, forming a black matrix BM, a color filter layer CFL, and an alignment layer AM1 on the first display substrate ST1.

S26. Forming a first liquid crystal cell by assembling the second display substrate ST2 formed thereon with the first wire grid polarizer WGP1 and the first array structure AS1 as illustrated in FIG. 24 with the first display substrate ST1 formed thereon with the black matrix BM, the color filter layer CFL, and the alignment layer AM1 as illustrated in FIG. 25; and the forming the first liquid crystal cell further includes forming a first liquid crystal layer in the first liquid crystal cell.

S27. As illustrated in FIG. 26, forming a second array structure AS2 and an alignment layer AM3 on the third display substrate ST3, and forming a second bonding portion BD2 on the third display substrate ST3.

S28. Forming a second liquid crystal cell by assembling the second display substrate ST2 of the first liquid crystal cell with the third display substrate ST3 formed thereon with the second array structure AS2; and the forming the second liquid crystal cell further includes forming a second liquid crystal layer in the second liquid crystal cell.

S29. Forming a polarizer at a side of the first display substrate ST1 away from the second display substrate ST2.

For example, in the embodiments of the present disclosure, the alignment layer AM, the alignment layer AM1, the alignment layer AM2, and the alignment layer AM3, can all adopt polyimide, but are not limited thereto.

Figure 27:
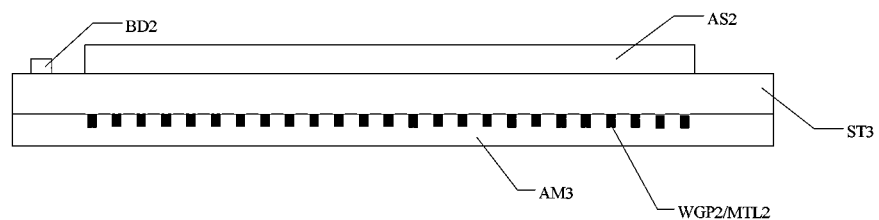
FIG. 27 is a schematic diagram of forming a second wire grid polarizer at a side of a third display substrate opposite to a side of the third display substrate provided with a second array structure in a manufacturing method of a display panel provided by an embodiment of the present disclosure.

FIG. 27 is a schematic diagram of forming a second wire grid polarizer at a side of a third display substrate opposite to a side of the third display substrate provided with a second array structure in a manufacturing method of a display panel provided by an embodiment of the present disclosure. For example, in the case where the second wire grid polarizer WGP2 is disposed at a side of the third display substrate ST3 away from the second display substrate ST2, the method further includes forming the second wire grid polarizer WGP2 at a side of the third display substrate ST3 opposite to the side of the third display substrate ST3 provided with the second array structure AS2. The manufacturing method of the second wire grid polarizer WGP2 can be referred to the manufacturing method of the first wire grid polarizer WGP1 and will not be described here.

For example, before assembling the first display substrate ST1 with the second display substrate ST2 to form the first liquid crystal cell CL1, forming the first wire grid polarizer WGP1 on the second display substrate ST2, and the first wire grid polarizer WGP1 is formed at a side of the second display substrate ST2 close to the first display substrate ST1.

For example, in the embodiments of the present disclosure, the directions of the light transmission axes of the polarizers POL1 and POL2 are the same, and the directions of the light transmission axes of the polarizers POL1 and POL2 are perpendicular to the direction of the light transmission axis of the first wire grid polarizer WGP1, but are not limited thereto.

In the embodiments of the present disclosure, the first array structure AS1 includes a first thin film transistor and a first electrode connected with a drain electrode of the first thin film transistor, and further includes a second electrode, and the first electrode and the second electrode are insulated from each other and form an electric field to drive the liquid crystal molecules in the first liquid crystal layer LCL1 to rotate. The second array structure AS2 includes a second thin film transistor and a third electrode connected with a drain electrode of the second thin film transistor, and further includes a fourth electrode, and the third electrode and the fourth electrode are insulated from each other and form an electric field to drive the liquid crystal molecules in the second liquid crystal layer LCL2 to rotate. The first array structure AS1 can be referred to a common design. The second array structure AS2 can be referred to a common design. For clarity, the specific structures of the first array structure AS1 and the first array structure AS2 are not illustrated in detail in the drawings of the embodiments of the present disclosure.

At least one embodiment of the present disclosure provides a display device which includes any one of the display substrates described above.

For example, the display device may include a liquid crystal display, and any product or component which includes the liquid crystal display and has a display function, such as a television, a digital camera, a mobile phone, a watch, a tablet computer, a notebook computer, a navigator, etc.

For example, in the embodiments of the present disclosure, a thickness of a certain element refers to a size of the element in a direction perpendicular to the second display substrate ST2. Further, for example, the thickness of a certain element refers to a distance between a surface of the element close to the second display substrate ST2 and a surface of the element away from the second display substrate ST2 in the direction perpendicular to the second display substrate ST2.

It should be noted that, for the sake of clarity, a thickness of a layer or region may be enlarged in the drawings for describing the embodiments of the present disclosure. It should be understood that in the case where an element such as a layer, film, region or substrate is referred to as being "on" or "under" another element, the element may be "directly" "on" or "under" the another element, or an intervening element may be present therebetween.

In the embodiment of the present disclosure, the shapes of the various elements are only illustratively described, and are not limited to those illustrated in the drawings, but can be determined according to needs.

In the embodiments of the present disclosure, the patterning or patterning process may include only a photolithography process, or may include a photolithography process and an etching process, or may include other processes for forming a predetermined pattern such as printing, inkjet, etc. The photolithography process refers to a process including film formation, exposure, development, etc., which uses a photoresist, a mask, an exposure machine, etc., to form a pattern. The corresponding patterning process can be selected according to the structure to be formed in the embodiments of the present disclosure.

In case of no conflict, the features in the same embodiment and in different embodiments of the present disclosure can be combined with each other.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. A manufacturing method of a display panel, comprising:
    assembling a first display substrate with a second display substrate to form a first liquid crystal cell; and
    assembling the second display substrate with a third display substrate to form a second liquid crystal cell,
    wherein the manufacturing method of the display panel further comprises:
    forming a first wire grid polarizer, the first wire grid polarizer being formed on the second display substrate; and
    forming a first bonding portion, the first bonding portion being formed at a side of the second display substrate close to the first display substrate and being located outside the first liquid crystal cell,
    wherein an orthographic projection of the first wire grid polarizer on the second display substrate is not overlapped with an orthographic projection of the first bonding portion on the second display substrate, after the assembling the first display substrate with the second display substrate to form the first liquid crystal cell, the manufacturing method comprises forming the first wire grid polarizer on the second display substrate, the first wire grid polarizer being formed at a side of the second display substrate away from the first display substrate,
before the forming the first wire grid polarizer, the manufacturing method further comprises: forming a first sealed space between the first display substrate and the second display substrate to seal the first liquid crystal cell,
the forming the first wire grid polarizer comprises cleaning the first display substrate and the second display substrate that are provided with the first sealed space,
the manufacturing method further comprising forming a dummy sealant located at an outer side of a first sealant, which is located between the first display substrate and the second display substrate, to form a second sealed space that is located outside the first liquid crystal cell.

2. The manufacturing method according to claim 1, wherein the first sealant and the dummy sealant are formed in the same patterning process.

3. The manufacturing method according to claim 1, wherein the first bonding portion is located outside the first liquid crystal cell and is located between the first sealant and the dummy sealant.

4. A manufacturing method of a display panel, comprising:
assembling a first display substrate with a second display substrate to form a first liquid crystal cell; and
assembling the second display substrate with a third display substrate to form a second liquid crystal cell,
wherein the manufacturing method of the display panel further comprises:
forming a first wire grid polarizer, the first wire grid polarizer being formed on the second display substrate; and
forming a first bonding portion, the first bonding portion being formed at a side of the second display substrate close to the first display substrate and being located outside the first liquid crystal cell,
wherein an orthographic projection of the first wire grid polarizer on the second display substrate is not overlapped with an orthographic projection of the first bonding portion on the second display substrate
wherein before assembling the first display substrate with the second display substrate to form the first liquid crystal cell, the manufacturing method further comprises: forming an anti-static protective layer at a side of the second display substrate; and after the assembling the first display substrate with the second display substrate to form the first liquid crystal cell and before the forming the first wire grid polarizer, the manufacturing method further comprises: removing the anti-static protective layer.

5. The manufacturing method according to claim 4, wherein the forming the first wire grid polarizer comprises:
forming a first metal film on the second display substrate;
patterning the first metal film to form a first metal pattern, the first metal pattern going beyond an edge of a display region of the display panel by at least 50 µm; and
patterning the first metal pattern in a nano-imprint manner to form the first wire grid polarizer.

6. The manufacturing method according to claim 4, wherein after the assembling the first display substrate with the second display substrate to form the first liquid crystal cell, the manufacturing method comprises forming the first wire grid polarizer on the second display substrate, the first wire grid polarizer being formed at a side of the second display substrate away from the first display substrate,
before the forming the first wire grid polarizer, the manufacturing method further comprises: forming a first sealed space between the first display substrate and the second display substrate to seal the first liquid crystal cell, and
the forming the first wire grid polarizer comprises: cleaning the first display substrate and the second display substrate that are provided with the first sealed space.

7. The manufacturing method according to claim 4, wherein after forming the first wire grid polarizer, the manufacturing method further comprises: forming a protective layer at a side of the second display substrate away from the first liquid crystal cell, wherein the protective layer covers the first wire grid polarizer and the protective layer adopts an optical clear adhesive.

8. The manufacturing method according to claim 4, further comprising: forming a second wire grid polarizer, wherein the second wire grid polarizer is formed at a side of the third display substrate away from the second display substrate, and an orthographic projection of the second wire grid polarizer on the second display substrate is not overlapped with the orthographic projection of the first bonding portion on the second display substrate.

9. The manufacturing method according to claim 8, further comprising: forming a second bonding portion, wherein the second bonding portion is formed at a side of the third display substrate close to the second display substrate and is located outside the second liquid crystal cell, and an orthographic projection of the second bonding portion on the third display substrate is not overlapped with an orthographic projection of the second wire grid polarizer on the third display substrate.

10. The manufacturing method according to claim 6, further comprising: forming a dummy sealant located at an outer side of a first sealant, which is located between the first display substrate and the second display substrate, to form a second sealed space that is located outside the first liquid crystal cell.

11. The manufacturing method according to claim 10, wherein the first sealant and the dummy sealant are formed in the same patterning process.

12. The manufacturing method according to claim 10, wherein the first bonding portion is located outside the first liquid crystal cell and is located between the first sealant and the dummy sealant.

* * * * *